United States Patent
Nakamura et al.

(10) Patent No.: US 10,308,852 B2
(45) Date of Patent: Jun. 4, 2019

(54) ANTISTATIC RESIN COMPOSITION AND POLYOLEFIN ANTISTATIC FIBER FOR CONTAINER AND PIPE FOR ORGANIC SOLVENT

(71) Applicant: ADEKA CORPORATION, Tokyo (JP)

(72) Inventors: Tatsuhito Nakamura, Saitama (JP); Chun Cui, Saitama (JP); Kazukiyo Nomura, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 15/563,395

(22) PCT Filed: Mar. 7, 2016

(86) PCT No.: PCT/JP2016/057029
§ 371 (c)(1),
(2) Date: Sep. 29, 2017

(87) PCT Pub. No.: WO2016/158224
PCT Pub. Date: Oct. 6, 2016

(65) Prior Publication Data
US 2018/0086958 A1  Mar. 29, 2018

(30) Foreign Application Priority Data

Mar. 30, 2015  (JP) .................. 2015-069062
Mar. 31, 2015  (JP) .................. 2015-071350

(51) Int. Cl.
| | |
|---|---|
| *C09K 3/16* | (2006.01) |
| *C08L 23/00* | (2006.01) |
| *D04H 1/4291* | (2012.01) |
| *D04H 3/14* | (2012.01) |
| *D01F 6/46* | (2006.01) |
| *C08L 101/00* | (2006.01) |
| *C08G 63/672* | (2006.01) |
| *C08L 23/06* | (2006.01) |
| *C08G 63/66* | (2006.01) |

(52) U.S. Cl.
CPC .............. *C09K 3/16* (2013.01); *C08G 63/672* (2013.01); *C08L 23/00* (2013.01); *C08L 23/06* (2013.01); *C08L 101/00* (2013.01); *D01F 6/46* (2013.01); *D04H 1/4291* (2013.01); *D04H 3/14* (2013.01); *C08G 63/66* (2013.01); *C08L 2201/04* (2013.01); *C08L 2203/12* (2013.01); *C08L 2203/18* (2013.01); *D10B 2321/021* (2013.01); *D10B 2331/04* (2013.01); *D10B 2401/16* (2013.01)

(58) Field of Classification Search
CPC ......... C09K 3/16; C08L 23/00; C08L 101/00; C08L 23/06; C08L 2201/04; C08L 2203/12; C08L 2203/18; C08G 63/66; C08G 63/672; D04H 1/4291; D04H 3/14; D01F 6/46; D10B 2321/021; D10B 2331/04; D10B 2401/16
See application file for complete search history.

(56) References Cited

U.S. PATENT DOCUMENTS

| | | |
|---|---|---|
| 2013/0323996 A1 | 12/2013 | Maehara et al. |
| 2015/0353796 A1 | 12/2015 | Nakamura et al. |
| 2016/0289375 A1 | 10/2016 | Nakamura et al. |
| 2017/0210959 A1 | 7/2017 | Nakamura et al. |

FOREIGN PATENT DOCUMENTS

| | | |
|---|---|---|
| EP | 3 196 273 A1 | 7/2017 |
| EP | 3235864 A1 | 10/2017 |
| EP | 3249018 A1 | 11/2017 |
| FR | 1596.522 A | 6/1970 |
| JP | 63-211350 A | 9/1988 |
| JP | 6-41858 A | 2/1994 |
| JP | 7-116329 B2 | 12/1995 |
| JP | 10-273526 A | 10/1998 |
| JP | 10-287738 A | 10/1998 |
| JP | 11-172090 A | 6/1999 |
| JP | 2003-313724 A | 11/2003 |

(Continued)

OTHER PUBLICATIONS

International Search Report for PCT/JP2016/057029 (PCT/ISA/210) dated May 31, 2016.
Written Opinion of the International Searching Authority for PCT/JP2016/057029 (PCT/ISA/237) dated May 31, 2016.
Extended European Search Report, dated Aug. 31, 2018, for European Application No. 16772108.3.

(Continued)

Primary Examiner — Michael C Miggins
(74) Attorney, Agent, or Firm — Birch, Stewart, Kolasch & Birch, LLP

(57) ABSTRACT

Provided are: an antistatic resin composition for containers and pipes of organic solvents, which has long-lasting and sufficient antistaticity and whose antistatic performance is not impaired even when the composition is in contact with an organic solvent for a long period of time; and a container and a pipe for organic solvents, which include the same.

The antistatic resin composition for containers and pipes of organic solvents contains 3 to 25 parts by mass of at least one polymer compound (E) with respect to 100 parts by mass of a thermoplastic resin, wherein the polymer compound (E) has a structure in which a diol, an aliphatic dicarboxylic acid, an aromatic dicarboxylic acid, a compound (B) which includes at least one group represented by the following Formula (1) and has hydroxyl groups at both ends, and an epoxy compound (D) having two or more epoxy groups are bound via ester bonds:

$$—CH_2—CH_2—O— \quad (1).$$

21 Claims, No Drawings

(56) References Cited

FOREIGN PATENT DOCUMENTS

| JP | 2012-167404 A | 9/2012 |
|---|---|---|
| JP | 2013-253028 A | 12/2013 |
| JP | 2016-23254 A | 2/2016 |
| JP | 2016-60784 A | 4/2016 |
| WO | WO 2014/115745 A1 | 7/2014 |
| WO | WO 2014/148454 A1 | 9/2014 |

OTHER PUBLICATIONS

Japanese Office Action, dated Mar. 12, 2019, for Japanese Application No. 2015-071350.

ANTISTATIC RESIN COMPOSITION AND POLYOLEFIN ANTISTATIC FIBER FOR CONTAINER AND PIPE FOR ORGANIC SOLVENT

TECHNICAL FIELD

The present invention relates to: an antistatic resin composition used for thermoplastic resin-made containers in which an organic solvent is stored and for thermoplastic resin-made pipes which come into contact with an organic solvent (hereinafter, the antistatic resin composition is also simply referred to as "resin composition"); and a container and a pipe which comprise the same. More particularly, the present invention relates to: an antistatic resin composition which yields a molded article (e.g., a container or a pipe) having long-lasting and sufficient antistaticity whose antistatic performance is not impaired even when the molded article is in contact with an organic solvent over a long period of time; and a container and a pipe which comprise the same.

The present invention also relates to an antistatic polyolefin fiber (hereinafter, also simply referred to as "antistatic fiber") and a fabric comprising the same. More particularly, the present invention relates to an antistatic polyolefin fiber which has excellent persistence and excellent water resistance, and a fabric comprising the same.

BACKGROUND ART

Thermoplastic resins are lightweight and easy to process and thus used in containers, pipes and the like of various shapes. Particularly, polyolefin resins are used in, for example, containers for storing organic solvents and pipes for transferring organic solvents therethrough.

However, thermoplastic resins, because of their excellent electrical insulation properties, have a characteristic feature of being easily electrically charged by friction and the like. Such electrification presents a risk of ignition or explosion of an organic solvent or flammable gas that is stored in the containers or passed through the pipes. Further, in the cases of medical containers, pipes and the like (e.g., containers for storing rubbing alcohol), attachment of dust caused by an electrostatic charge is not preferred also from the hygiene standpoint.

Antistatic agents are used for the purpose of inhibiting such electrification of containers and pipes. For example, Patent Documents 1 and 2 describe the use of a polyhydric alcohol ester (e.g., glycerin monostearate) as an antistatic agent in a container made of a polyolefin resin.

It is generally known to obtain fibers and filaments from a polyolefin resin, and nonwoven fabrics are produced from such fibers. However, since polyolefin resins have electrical insulation properties, and there is a problem of being easily electrically charged by friction and the like and thereby attracting dust and dirt in the surroundings. Particularly, in workwears and the like using such nonwoven fabrics, attraction of dust and the like is problematic. Further, nonwoven fabrics are used in transport materials and packaging materials of electric/electronic components and instruments, and the generation of static electricity presents a major problem since it causes malfunction and attracts fine dust and the like.

Concerning such problems, Patent Document 3 proposes a nonwoven fabric in which antistaticity is imparted through hydrophilization by mixing a surfactant in the raw materials in advance. Further, Patent Document 4 proposes a polyolefin nonwoven fabric which contains a modified polyolefin and a surfactant as an antistatic agent. Moreover, Patent Document 5 proposes the use of a polymer-type antistatic agent such as polyether ester amide in nonwoven fabrics.

RELATED ART DOCUMENTS

Patent Documents

Patent Document 1: Japanese Examined Patent Application Publication No. H7-116329
Patent Document 2: Japanese Unexamined Patent Application Publication No. 2013-253028
Patent Document 3: Japanese Unexamined Patent Application Publication No. S63-211350
Patent Document 4: Japanese Unexamined Patent Application Publication No. H6-41858
Patent Document 5: Japanese Unexamined Patent Application Publication No. 2003-313724

SUMMARY OF THE INVENTION

Problems to be Solved by the Invention

However, these conventional antistatic agents exhibit their antistatic performance by bleeding after molding of the resin compositions; therefore, in those applications that come into contact with an organic solvent, such as containers and pipes for organic solvents, the antistatic agents may lose their effects due to elution, and there is also a problem in terms of organic solvent resistance. In addition, there is also a problem of contamination of the contents with an antistatic component, and this presents a major problem particularly in medical applications and the like.

In view of the above, an object of the present invention is to provide: an antistatic resin composition for containers and pipes of organic solvents, which has long-lasting and sufficient antistaticity and whose antistatic performance is not impaired even when the composition is in contact with an organic solvent for a long period of time; and a container and a pipe for organic solvents, which comprise the same.

When a surfactant is used as in the cases of Patent Documents 3 and 4, there are problems that the persistence of the antistatic performance is poor and washing with water or the like leads to the loss of the antistatic performance. In addition, even when a polymer-type antistatic agent is used as in the case of Patent Document 5, sufficient antistatic performance cannot be attained without adding a large amount of the polymer-type antistatic agent to the resin. Furthermore, in the nonwoven fabric proposed in Patent Document 5 in which a polymer-type antistatic agent such as polyether ester amide is used, for example, the persistence of antistatic performance and the water resistance are not satisfactory.

Therefore, another object of the present invention is to provide: an antistatic polyolefin fiber which has excellent persistence and water resistance; and a fabric comprising the same.

Means for Solving the Problems

The present inventors intensively studied to solve the above-described problems and consequently discovered that the problems can be solved by using an antistatic polymer compound having a specific structure, thereby completing the present invention.

That is, the antistatic resin composition for containers and pipes of organic solvents according to the present invention is characterized by comprising 3 to 25 parts by mass of at least one polymer compound (E) with respect to 100 parts by mass of a thermoplastic resin, wherein the polymer compound (E) has a structure in which a diol, an aliphatic dicarboxylic acid, an aromatic dicarboxylic acid, a compound (B) which comprises at least one group represented by the following Formula (1) and has hydroxyl groups at both ends, and an epoxy compound (D) having two or more epoxy groups are bound via ester bonds:

—CH$_2$—CH$_2$—O—                                                    (1)

In the resin composition of the present invention, it is preferred that the polymer compound (E) has a structure in which a polyester (A), which is constituted by a diol, an aliphatic dicarboxylic acid and an aromatic dicarboxylic acid, the compound (B) and the epoxy compound (D) are bound via ester bonds.

In the resin composition of the present invention, it is also preferred that the polymer compound (E) has a structure in which a block polymer (C) having carboxyl groups at both ends and the epoxy compound (D) are bound via an ester bond, the block polymer (C) comprising a block constituted by the polyester (A) and a block constituted by the compound (B) that are repeatedly and alternately bound via ester bonds.

Further, in the resin composition of the present invention, it is preferred that the polyester (A) constituting the polymer compound (E) has a structure comprising carboxyl groups at both ends.

Still further, in the resin composition of the present invention, it is preferred that, in the polymer compound (E), the block constituted by the polyester (A) has a number-average molecular weight of 800 to 8,000 in terms of polystyrene; the block constituted by the compound (B) has a number-average molecular weight of 400 to 6,000 in terms of polystyrene; and the block polymer (C) has a number-average molecular weight of 5,000 to 25,000 in terms of polystyrene.

Yet still further, in the resin composition of the present invention, it is preferred that the compound (B) constituting the polymer compound (E) is a polyethylene glycol.

Yet still further, it is preferred that the resin composition of the present invention further comprises 0.1 to 5 parts by mass of at least one selected from the group consisting of alkali metal salts (F) and Group II element salts with respect to 100 parts by mass of the thermoplastic resin.

Yet still further, in the resin composition of the present invention, it is preferred that the thermoplastic resin is a polyolefin resin.

The container for organic solvents and the pipe for organic solvents according to the present invention are characterized in that they are obtained by molding the resin composition of the present invention.

Moreover, the present inventors intensively studied to solve the above-described problems and consequently discovered that the problems can be solved by a fiber comprising a resin composition in which a prescribed amount of an antistatic polymer compound having a specific structure is added, thereby completing the present invention.

That is, the antistatic polyolefin fiber of the present invention is characterized by comprising a resin composition containing 1 to 40 parts by mass of at least one polymer compound (L) with respect to 100 parts by mass of a polyolefin resin, wherein the polymer compound (L) has a structure in which a diol, an aliphatic dicarboxylic acid, an aromatic dicarboxylic acid, a compound (I) which comprises at least one group represented by the following Formula (1) and has hydroxyl groups at both ends, and a compound (K) having a reactive functional group are bound via ester bonds:

—CH$_2$—CH$_2$—O—                                                    (1)

In the antistatic polyolefin fiber of the present invention, it is preferred that the polymer compound (L) has a structure in which a polyester (H), which is constituted by a diol, an aliphatic dicarboxylic acid and an aromatic dicarboxylic acid, the compound (I) and the compound (K) having a reactive functional group are bound via ester bonds.

In the antistatic polyolefin fiber of the present invention, it is also preferred that the polymer compound (L) has a structure in which a block polymer (J) having carboxyl groups at both ends and the compound (K) having a reactive functional group are bound via an ester bond, the block polymer (J) comprising a block constituted by the polyester (H) and a block constituted by the compound (I) that are repeatedly and alternately bound via ester bonds.

Further, in the antistatic polyolefin fiber of the present invention, it is preferred that the polyester (H) constituting the polymer compound (L) has a structure comprising carboxyl groups at both ends.

Still further, in the antistatic polyolefin fiber of the present invention, it is preferred that, in the polymer compound (L), the block constituted by the polyester (H) has a number-average molecular weight of 800 to 8,000 in ter is of polystyrene; the block constituted by the compound (I) has a number-average molecular weight of 400 to 6,000 in terms of polystyrene; and the block polymer (J) has a number-average molecular weight of 5,000 to 25,000 in terms of polystyrene.

Yet still further, in the antistatic polyolefin fiber of the present invention, it is preferred that the compound (I) constituting the polymer compound (L) is a polyethylene glycol.

Yet still further, it is preferred that the antistatic polyolefin fiber of the present invention further comprises 0.1 to 15 parts by mass of at least one selected from the group consisting of alkali metal salts and Group II element salts (M) with respect to 100 parts by mass of the polyolefin resin.

Yet still further, in the antistatic polyolefin fiber of the present invention, it is preferred that the compound (K) having a reactive functional group is an epoxy compound (K-1) having two or more epoxy groups as reactive functional groups, or a polyhydric alcohol compound (K-2) having three or more hydroxyl groups as reactive functional groups.

The fabric of the present invention is characterized by comprising the antistatic polyolefin fiber of the present invention, and the fabric of the present invention is preferably a nonwoven fabric.

Effects of the Invention

According to the present invention, an antistatic resin composition for containers and pipes of organic solvents, which can yield a molded article having long-lasting and sufficient antistaticity whose antistatic performance is not impaired even when the molded article is in contact with an organic solvent for a long period of time, can be provided. Further, according to the present invention, a container and a pipe for organic solvents, which have long-lasting and sufficient antistaticity and whose antistatic performance is not impaired even when the container and the pipe are in contact with an organic solvent for a long period of time, can be provided.

Moreover, according to the present invention, an antistatic polyolefin fiber which has excellent persistence and water resistance and a fabric comprising the same can be provided.

MODE FOR CARRYING OUT THE INVENTION

The present invention will now be described in detail.
[Antistatic Resin Composition for Containers and Pipes of Organic Solvents]

First, the antistatic resin composition for containers and pipes of organic solvents according to the present invention will be described.

The resin composition of the present invention comprises 3 to 25 parts by mass of at least one polymer compound (E) with respect to 100 parts by mass of a thermoplastic resin. In the resin composition of the present invention, the polymer compound (E) has a structure in which a diol, an aliphatic dicarboxylic acid, an aromatic dicarboxylic acid, a compound (B) which comprises at least one group represented by the following Formula (1) and has hydroxyl groups at both ends, and an epoxy compound (D) having two or more epoxy groups are bound via ester bonds:

—CH$_2$—CH$_2$—O—  (1)

The thermoplastic resin used in the present invention will now be described.

The resin used in the resin composition of the present invention is not restricted as long as it is a thermoplastic resin; however, from the standpoints of the persistence of antistatic performance and the organic solvent resistance, the resin is preferably a polyolefin resin.

Examples of the polyolefin resin include α-olefin polymers, such as polyethylenes, low-density polyethylenes, linear low-density polyethylenes, high-density polyethylenes, polypropylenes, homopolypropylenes, random copolymer polypropylenes, block copolymer polypropylenes, isotactic polypropylenes, syndiotactic polypropylenes, hemi-isotactic polypropylenes, polybutenes, cycloolefin polymers, stereo block polypropylenes, poly-3-methyl-1-butene, poly-3-methyl-1-pentene and poly-4-methyl-1-pentene; α-olefin copolymers, such as ethylene-propylene block or random copolymers, impact copolymer polypropylenes, ethylene-methyl methacrylate copolymers, ethylene-methyl acrylate copolymers, ethylene-ethyl acrylate copolymers, ethylene-butyl acrylate copolymers and ethylene-vinyl acetate copolymers; and polyolefin-based thermoplastic elastomers, and these polyolefin resins may each be a copolymer of two or more of these polymers/elastomers. Two or more of such polyolefin resins may be used in combination.

In the resin composition of the present invention, examples of a thermoplastic resin other than polyolefin resins include polystyrene resins, and examples thereof include vinyl group-containing aromatic hydrocarbon homopolymers, and copolymers of a vinyl group-containing aromatic hydrocarbon and other monomer(s) (e.g., maleic anhydride, phenylmaleimide, (meth)acrylate, butadiene and/or (meth)acrylonitrile), for example, thermoplastic resins such as polystyrene (PS) resins, high-impact polystyrenes (HIPS), acrylonitrile-styrene (AS) resins, acrylonitrile-butadiene-styrene (ABS) resins, methyl methacrylate-butadiene-styrene (MBS) resins, heat-resistant ABS resins, acrylonitrile-acrylate-styrene (AAS) resins, styrene-maleic anhydride (SMA) resins, methacrylate-styrene (MS) resins, styrene-isoprene-styrene (SIS) resins, acrylonitrile-ethylene-propylene rubber-styrene (AES) resins, styrene-butadiene-butylene-styrene (SBBS) resins and methyl methacrylate-acrylonitrile-butadiene-styrene (MABS) resins; and hydrogenated styrene-based elastomer resins obtained by hydrogenation of the double bond of butadiene or isoprene in the above-described resins, such as styrene-ethylene-butylene-styrene (SEBS) resins, styrene-ethylene-propylene-styrene (SEPS) resins, styrene-ethylene-propylene (SEP) resins and styrene-ethylene-ethylene-propylene-styrene (SEEPS) resins.

Examples of a thermoplastic resin that can be used further include halogen-containing resins, such as polyvinyl chloride, polyvinylidene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers, and vinyl chloride-cyclohexylmaleimide copolymers; petroleum resins; coumarone resins; polyvinyl acetates; acrylic resins; polymethyl methacrylates; polyvinyl alcohols; polyvinyl formals; polyvinyl butyrals; aromatic polyesters such as polyalkylene terephthalates (e.g., polyethylene terephthalate, polybutylene terephthalate and polycyclohexane dimethylene terephthalate) and polyalkylene naphthalates (e.g., polyethylene naphthalate and polybutylene naphthalate), and linear polyesters such as polytetramethylene terephthalate; degradable aliphatic polyesters, such as polyhydroxy butyrate, polycaprolactone, polybutylene succinate, polyethylene succinate, polylactic acid, polymalic acid, polyglycolic acid, polydioxane and poly(2-oxetanone); and thermoplastic resins and blends thereof, such as polyamides (e.g., polyphenylene oxide, polycaprolactam and polyhexamethylene adipamide), polycarbonates, polycarbonate/ABS resins, branched polycarbonates, polyacetals, polyphenylene sulfides, polyurethanes, cellulose-based resins, polyimide resins, polysulfones, polyphenylene ethers, polyether ketones, polyether ether ketones and liquid crystal polymers. Further, elastomers such as isoprene rubbers, butadiene rubbers, acrylonitrile-butadiene copolymer rubbers, styrene-butadiene copolymer rubbers, fluorocarbon rubbers, silicone rubbers, polyester-based elastomers, nitrile-based elastomers, nylon-based elastomers, vinyl chloride-based elastomers, polyamide-based elastomers and polyurethane-based elastomers may also be used.

In the resin composition of the present invention, these thermoplastic resins may be used individually, or two or more thereof may be used in combination. Moreover, these thermoplastic resins may be alloyed as well. These thermoplastic resins can be used regardless of, for example, molecular weight, polymerization degree, density, softening point, ratio of solvent-insoluble component(s), degree of stereoregularity, presence or absence of catalyst residue, type and blend ratio of each material monomer, type of polymerization catalyst (e.g., a Ziegler catalyst or a metallocene catalyst).

Next, the polymer compound (E) used in the present invention will be described.

The polymer compound (E) is incorporated for the purpose of imparting antistaticity to the resin composition of the present invention.

As described above, the polymer compound (E) used in the present invention has a structure in which a diol, an aliphatic dicarboxylic acid, an aromatic dicarboxylic acid, a compound (B) which comprises at least one group represented by the following Formula (1) and has hydroxyl groups at both ends, and an epoxy compound (D) having two or more epoxy groups are bound via ester bonds:

—CH$_2$—CH$_2$—O—  (1)

The polymer compound (E) can be obtained by allowing a diol, an aliphatic dicarboxylic acid, an aromatic dicarboxylic acid, a compound (B) which comprises at least one group represented by the Formula (1) and has hydroxyl groups at both ends, and an epoxy compound (D) having two or more epoxy groups to undergo an esterification reaction.

First, the diol used in the polymer compound (E) of the present invention will be described.

Examples of the diol used in the present invention include aliphatic diols and aromatic group-containing diols. Two or more of these diols may be used as a mixture. Examples of the aliphatic diols include 1,2-ethanediol (ethylene glycol), 1,2-propanediol (propylene glycol), 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, 1,4-cyclohexane dimethanol, hydrogenated bisphenol A, 1,2-, 1,3- or 1,4-cyclohexanediol, cyclododecanediol, dimer diol, hydrogenated dimer diol, diethylene glycol, dipropylene glycol, triethylene glycol, and polyethylene glycol. Among these aliphatic diols, 1,4-cyclohexane dimethanol and hydrogenated bisphenol A are preferred from the standpoints of the persistence of antistatic performance and the organic solvent resistance, and 1,4-cyclohexane dimethanol is more preferred.

The aliphatic diols are preferably hydrophobic; therefore, among aliphatic diols, hydrophilic polyethylene glycols are not preferred. This, however, does not apply to those cases where they are used in combination with other diol.

Examples of the aromatic group-containing diols include polyhydroxyethyl adducts of mononuclear dihydric phenol compounds, such as bisphenol A, 1,2-hydroxybenzene, 1,3-hydroxybenzene, 1,4-hydroxybenzene, 1,4-benzenediethanol, bisphenol A-ethylene oxide adduct, bisphenol A-propylene oxide adduct, 1,4-bis(2-hydroxyethoxy)benzene, resorcin and pyrocatechol. Among these aromatic group-containing diols, from the standpoints of the persistence of antistatic performance and the organic solvent resistance, bisphenol A-ethylene oxide adduct and 1,4-bis(β-hydroxyethoxy)benzene are preferred.

Next, the aliphatic dicarboxylic acid used in the polymer compound (E) of the present invention will be described.

The aliphatic dicarboxylic acid used in the present invention may be a derivative (such as an acid anhydride, an alkyl ester, an alkali metal salt or an acid halide) of an aliphatic dicarboxylic acid. Further, two or more aliphatic dicarboxylic acids and derivatives thereof may be used in combination.

The aliphatic dicarboxylic acid is preferably, for example, an aliphatic dicarboxylic acid having 2 to 20 carbon atoms, examples of which include oxalic acid, malonic acid, succinic acid, glutaric acid, adipic acid, pimelic acid, suberic acid, azelaic acid, sebacic acid, 1,10-decanedicarboxylic acid, 1,4-cyclohexanedicarboxylic acid, dimer acid, maleic acid and fumaric acid. Among these aliphatic dicarboxylic acids, from the standpoints of the melting point and the heat resistance, ones having 4 to 16 carbon atoms are preferred, and ones having 6 to 12 carbon atoms are more preferred.

Next, the aromatic dicarboxylic acid used in the polymer compound (E) of the present invention will be described.

The aromatic dicarboxylic acid used in the present invention may be a derivative (such as an acid anhydride, an alkyl ester, an alkali metal salt or an acid halide) of an aromatic dicarboxylic acid. Further, two or more aromatic dicarboxylic acids and derivatives thereof may be used in combination.

The aromatic dicarboxylic acid is preferably, for example, an aromatic dicarboxylic acid having 8 to 20 carbon atoms, examples of which include terephthalic acid, isophthalic acid, phthalic acid, phenylmalonic acid, homophthalic acid, phenylsuccinic acid, β-phenylglutaric acid, α-phenyladipic acid, ρ-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

Next, the compound (B) used in the present invention, which comprises at least one group represented by the Formula (1) and has hydroxyl groups at both ends, will be described.

The compound (B) which comprises at least one group represented by the Formula (1) and has hydroxyl groups at both ends is preferably a hydrophilic compound, more preferably a polyether having the group represented by the Formula (1), particularly preferably a polyethylene glycol represented by the following Formula (2):

HO—[—CH$_2$—CH$_2$—O—]$_m$H  (2)

In the Formula (2), m represents a number of 5 to 250. From the standpoints of the heat resistance and the compatibility, m is preferably 20 to 150.

Examples of the compound (B) include polyethylene glycols obtained by addition reaction of ethylene oxide; and polyethers obtained by addition reaction of ethylene oxide and at least one other alkylene oxide (e.g., propylene oxide, or 1,2-, 1,4-, 2,3- or 1,3-butylene oxide), which polyethers may be random or block polyethers.

Examples of the compound (B) also include compounds having a structure in which ethylene oxide is added to an active hydrogen atom-containing compound; and compounds having a structure in which ethylene oxide and at least one other alkylene oxide (e.g., propylene oxide, or 1,2-, 1,4-, 2,3- or 1,3-butylene oxide) are added. The addition in these compounds may be random or block addition.

The active hydrogen atom-containing compound is, for example, a glycol, a dihydric phenol, a primary monoamine, a secondary diamine or a dicarboxylic acid.

As the glycol, for example, an aliphatic glycol having 2 to 20 carbon atoms, an alicyclic glycol having 5 to 12 carbon atoms or an aromatic glycol having 8 to 26 carbon atoms can be used.

Examples of the aliphatic glycol include ethylene glycol, 1,2-propylene glycol, 1,3-propanediol, 1,2-butanediol, 1,3-butanediol, 1,4-butanediol, 1,3-hexanediol, 1,4-hexanediol, 1,6-hexanediol, 2,5-hexanediol, 1,2-octanediol, 1,8-octanediol, 1,10-decanediol, 1,18-octadecanediol, 1,20-eicosanediol, diethylene glycol, triethylene glycol, and thiodiethylene glycol.

Examples of the alicyclic glycol include 1-hydroxymethyl-1-cyclobutanol, 1,2-cyclohexanediol, 1,3-cyclohexanediol, 1,4-cyclohexanediol, 1-methyl-3,4-cyclohexanediol, 2-hydroxymethylcyclohexanol, 4-hydroxymethylcyclohexanol, 1,4-cyclohexane dimethanol, and 1,1'-dihydroxy-1,1'-dicyclohexyl.

Examples of the aromatic glycol include dihydroxymethylbenzene, 1,4-bis(β-hydroxyethoxy)benzene, 2-phenyl-1,3-propanediol, 2-phenyl-1,4-butanediol, 2-benzyl-1,3-propanediol, triphenylethylene glycol, tetraphenylethylene glycol, and benzopinacol.

As the dihydric phenol, a phenol having 6 to 30 carbon atoms can be used, and examples thereof include catechol, resorcinol, 1,4-dihydroxybenzene, hydroquinone, bisphenol A, bisphenol F, bisphenol S, dihydroxydiphenyl ether, dihydroxydiphenyl thioether, binaphthol, and alkyl (C1 to C10) or halogen substitution products of these phenols.

Examples of the primary monoamine include aliphatic primary monoamines having 1 to 20 carbon atoms, such as methylamine, ethylamine, n-propylamine, isopropylamine, n-butylamine, s-butylamine, isobutylamine, n-amylamine, isoamylamine, n-hexylamine, n-heptylamine, n-octylamine, n-decylamine, n-octadecylamine and n-eicosylamine.

As the secondary diamine, for example, an aliphatic secondary diamine having 4 to 18 carbon atoms, a heterocyclic secondary diamine having 4 to 13 carbon atoms, an alicyclic secondary diamine having 6 to 14 carbon atoms, an aromatic secondary diamine having 8 to 14 carbon atoms or a secondary alkanoldiamine having 3 to 22 carbon atoms can be used.

Examples of the aliphatic secondary diamine include N,N'-dimethylethylenediamine, N,N'-diethylethylenediamine, N,N'-dibutylethylenediamine, N,N'-dimethylpropylenediamine, N,N'-diethylpropylenediamine, N,N'-dibutylpropylenediamine, N,N'-dimethyltetramethylenediamine, N,N'-diethyltetramethylenediamine, N,N'-dibutyltetramethylenediamine, N,N'-dimethylhexamethylenediamine, N,N'-diethylhexamethylenediamine, N,N'-dibutylhexamethylenediamine, N,N'-dimethyldecamethylenediamine, N,N'-diethyldecamethylenediamine, and N,N'-dibutyldecamethylenediamine.

Examples of the heterocyclic secondary diamine include piperazine and 1-aminopiperidine.

Examples of the alicyclic secondary diamine include N,N'-dimethyl-1,2-cyclobutanediamine, N,N'-diethyl-1,2-cyclobutanediamine, N,N'-dibutyl-1,2-cyclobutanediamine, N,N'-dimethyl-1,4-cyclohexanediamine, N,N'-diethyl-1,4-cyclohexanediamine, N,N'-dibutyl-1,4-cyclohexanediamine, N,N'-dimethyl-1,3-cyclohexanediamine, N,N'-diethyl-1,3-cyclohexanediamine, and N,N'-dibutyl-1,3-cyclohexanediamine.

Examples of the aromatic secondary diamine include N,N'-dimethyl-phenylenediamine, N,N'-dimethyl-xylylenediamine, N,N'-dimethyl-diphenylmethanediamine, N,N'-dimethyl-diphenyl ether diamine, N,N'-dimethyl-benzidine, and N,N'-dimethyl-1,4-naphthalenediamine.

Examples of the secondary alkanoldiamine include N-methyldiethanolamine, N-octyldiethanolamine, N-stearyldiethanolamine, and N-methyldipropanolamine.

As the dicarboxylic acid, a dicarboxylic acids having 2 to 20 carbon atoms can be used, and examples thereof include aliphatic dicarboxylic acids, aromatic dicarboxylic acids, and alicyclic dicarboxylic acids.

Examples of the aliphatic dicarboxylic acids include oxalic acid, malonic acid, succinic acid, glutaric acid, methylsuccinic acid, dimethylmalonic acid, β-methylglutaric acid, ethylsuccinic acid, isopropylmalonic acid, adipic acid, pimelic acid, suberic acid, azelaic acid, sebacic acid, undecanedicarboxylic acid, dodecanedicarboxylic acid, tridecanedicarboxylic acid, tetradecanedicarboxylic acid, hexadecanedicarboxylic acid, octadecanedicarboxylic acid, and eicosanedicarboxylic acid.

Examples of the aromatic dicarboxylic acids include terephthalic acid, isophthalic acid, phthalic acid, phenylmalonic acid, homophthalic acid, phenylsuccinic acid, β-phenylglutaric acid, α-phenyladipic acid, β-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

Examples of the alicyclic dicarboxylic acids include 1,3-cyclopentanedicarboxylic acid, 1,2-cyclopentanedicarboxylic acid, 1,4-cyclohexanedicarboxylic acid, 1,2-cyclohexanedicarboxylic acid, 1,3-cyclohexanedicarboxylic acid, 1,4-cyclohexanediacetic acid, 1,3-cyclohexanediacetic acid, 1,2-cyclohexanediacetic acid, and dicyclohexyl-4,4'-dicarboxylic acid.

These active hydrogen atom-containing compounds may be used individually, or two or more thereof may be used in combination.

Next, the epoxy compound (D) used in the present invention, which has two or more epoxy groups, will be described.

The epoxy compound (D) used in the present invention is not particularly restricted as long as it has two or more epoxy groups, and examples of such an epoxy compound include polyglycidyl ether compounds of mononuclear polyhydric phenol compounds, such as hydroquinone, resorcin, pyrocatechol and phloroglucinol; polyglycidyl ether compounds of polynuclear polyhydric phenol compounds, such as dihydroxynaphthalene, biphenol, methylene bisphenol (bisphenol F), methylene bis(o-cresol), ethylidene bisphenol, isopropylidene bisphenol (bisphenol A), isopropylidene bis(o-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, o-cresol novolac, ethylphenol novolac, butylphenol novolac, octylphenol novolac, resorcin novolac and terpene phenol; polyglycidyl ethers of polyhydric alcohols, such as ethylene glycol, propylene glycol, butylene glycol, hexanediol, polyethylene glycol, polyglycol, thiodiglycol, glycerin, trimethylolpropane, pentaerythritol, sorbitol and bisphenol A-ethylene oxide adduct; homo- or co-polymers of glycidyl ester of an aliphatic, aromatic or alicyclic polybasic acid, such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid or endomethylene tetrahydrophthalic acid, and glycidyl methacrylate; glycidylamino group-containing epoxy compounds, such as N,N-diglycidyl aniline, bis(4-(N-methyl-N-glycidylamino)phenyl)methane and diglycidyl o-toluidine; epoxidized cyclic olefin compounds, such as vinylcyclohexene diepoxide, dicyclopentadiene diepoxide, 3,4-epoxycyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl)adipate; epoxidized conjugated diene polymers, such as epoxidized polybutadienes and epoxidized styrene-butadiene copolymers; heterocyclic compounds such as triglycidyl isocyanurate; and epoxidized soybean oil. These epoxy compounds may be internally cross-linked by a prepolymer of terminal isocyanate, or may be allowed to have a high molecular weight using a multivalent active hydrogen compound (e.g., a polyhydric phenol, a polyamine, a carbonyl group-containing compound or a polyphosphoric acid ester).

Two or more of such epoxy compounds (D) may be used in combination.

From the standpoints of the persistence of antistatic performance and the organic solvent resistance, it is preferred that the polymer compound (E) has a structure in which a polyester (A), which is constituted by a diol, an aliphatic dicarboxylic acid and an aromatic dicarboxylic acid, the compound (B) and the epoxy compound (D) are bound via ester bonds.

Further, from the standpoints of the persistence of antistatic performance and the organic solvent resistance, it is also preferred that the polymer compound (E) has a structure in which a block polymer (C) having carboxyl groups at both ends and the epoxy compound (D) are bound via an ester bond, the block polymer (C) comprising a block constituted by the polyester (A), which is constituted by a diol, an aliphatic dicarboxylic acid and an aromatic dicarboxylic acid, and a block constituted by the compound (B), which blocks are repeatedly and alternately bound via ester bonds.

The polyester (A) according to the present invention may be any polyester as long as it is composed of a diol, an aliphatic dicarboxylic acid and an aromatic dicarboxylic acid, and it is preferred that the polyester (A) has a structure in which a residue obtained by removing a hydroxyl group from the diol and a residue obtained by removing a carboxyl group from the aliphatic dicarboxylic acid are bound via an ester bond and the residue obtained by removing a hydroxyl group from the diol and a residue obtained by removing a carboxyl group from the aromatic dicarboxylic acid are bound via an ester bond.

It is also preferred that the polyester (A) has a structure comprising carboxyl groups at both ends. Further, the polymerization degree of the polyester (A) is preferably in a range of 2 to 50.

The polyester (A) having carboxyl groups at both ends can be obtained by, for example, allowing the above-described aliphatic dicarboxylic acid and the above-described aromatic dicarboxylic acid to undergo a polycondensation reaction with the above-described diol.

The aliphatic dicarboxylic acid may be a derivative (such as an acid anhydride, an alkyl ester, an alkali metal salt or an acid halide) of an aliphatic dicarboxylic acid and, in cases where the polyester (A) is obtained using such a derivative, both ends of the polyester (A) can eventually be treated to be carboxyl groups, and the polyester (A) in this state may be directly subjected to the subsequent reaction for obtaining the block polymer (C) having a structure comprising carboxyl groups at both ends. Further, two or more aliphatic dicarboxylic acids and derivatives thereof may be used in combination.

The aromatic dicarboxylic acid may be a derivative (such as an acid anhydride, an alkyl ester, an alkali metal salt or an acid halide) of an aromatic dicarboxylic acid, and in cases where the polyester is obtained using such a derivative, both ends of the polyester can eventually be treated to be carboxyl groups, and the polyester in this state may be directly subjected to the subsequent reaction for obtaining the block polymer (C) having a structure comprising carboxyl groups at both ends. Further, two or more aromatic dicarboxylic acids and derivatives thereof may be used in combination.

In the polyester (A), the molar ratio of a residue excluding the carboxyl groups of the aliphatic dicarboxylic acid and the residue excluding the carboxyl groups of the aromatic dicarboxylic acid is preferably 90:10 to 99.9:0.1, more preferably 93:7 to 99.9:0.1.

The polyester (A) having carboxyl groups at both ends can be obtained by, for example, allowing the above-described aliphatic dicarboxylic acid or derivative thereof and the above-described aromatic dicarboxylic acid or derivative thereof to undergo a polycondensation reaction with the above-described diol.

As for the reaction ratio of the aliphatic dicarboxylic acid or derivative thereof and the aromatic dicarboxylic acid or derivative thereof with respect to the diol, it is preferred that the aliphatic dicarboxylic acid or derivative thereof and the aromatic dicarboxylic acid or derivative thereof are used in an excess amount, particularly in an excess of 1 mole in terms of molar ratio with respect to the diol, such that the resulting polyester has carboxyl groups at both ends.

In the polycondensation reaction, the compounding ratio of the aliphatic dicarboxylic acid or derivative thereof and the aromatic dicarboxylic acid or derivative thereof is, in terms of molar ratio, preferably 90:10 to 99.9:0.1, more preferably 93:7 to 99.9:0.1.

Depending on the compounding ratio and the reaction conditions, a polyester consisting of only the diol and the aliphatic dicarboxylic acid and a polyester consisting of only the diol and the aromatic dicarboxylic acid may be generated; however, in the present invention, the polyester (A) may contain such polyesters, or the block polymer (C) may be obtained by directly allowing such polyesters to react with the component (B).

In the polycondensation reaction, a catalyst which promotes esterification reaction may be used and, as such a catalyst, a conventionally known catalyst such as dibutyl tin oxide, tetraalkyl titanate, zirconium acetate or zinc acetate can be employed.

In cases where a derivative such as a carboxylic acid ester, metal carboxylate or carboxylic acid halide is used in place of the dicarboxylic acid of the aliphatic dicarboxylic acid and the aromatic dicarboxylic acid, after the derivative and the diol are allowed to react with each other, both ends of the resultant may be treated to be dicarboxylic acids, or the resultant may be directly subjected to the subsequent reaction for obtaining the block polymer (C) having a structure comprising carboxyl groups at both ends.

A preferred polyester (A), which is composed of a diol, an aliphatic dicarboxylic acid and an aromatic dicarboxylic acid and has carboxyl groups at both ends, may be any polyester as long as it reacts with the component (B) to form an ester bond and thereby constitutes the structure of the block polymer (C), and the carboxyl groups at the both ends may be protected or modified, or may be in a precursor form. Further, in order to inhibit oxidation of the product during the reaction, an antioxidant such as a phenolic antioxidant may also be added to the reaction system.

The compound (B) having hydroxyl groups at both ends may be any compound as long as it reacts with the component (A) to form an ester bond and thereby constitutes the structure of the block polymer (C), and the hydroxyl groups at the both ends may be protected or modified, or may be in a precursor form.

The block polymer (C) according to the present invention, which has a structure comprising carboxyl groups at both ends, contains a block constituted by the polyester (A) and a block constituted by the compound (B) and has a structure in which these blocks are repeatedly and alternately bound via ester bonds formed by carboxyl groups and hydroxyl groups. One example of the block polymer (C) is a block polymer having a structure represented by the following Formula (3):

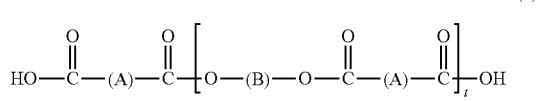

(3)

In the Formula (3), (A) represents a block constituted by the polyester (A) having carboxyl groups at both ends; (B) represents a block constituted by the compound (B) having hydroxyl groups at both ends; and t represents the number of repeating units, which is preferably 1 to 10, more preferably 1 to 7, most preferably 1 to 5.

In the block polymer (C), the block constituted by the polyester (A) may be partially replaced with a block constituted by a polyester consisting of only a diol and an aliphatic dicarboxylic acid or a block constituted by a polyester consisting of only a diol and an aromatic dicarboxylic acid.

The block polymer (C) having a structure comprising carboxyl groups at both ends can be obtained by allowing the polyester (A) having carboxyl groups at both ends and the compound (B) having hydroxyl groups at both ends to undergo a polycondensation reaction; however, as long as the block polymer (C) has a structure that is equivalent to the one in which the polyester (A) and the compound (B) are repeatedly and alternately bound via ester bonds formed by carboxyl groups and hydroxyl groups, it is not necessarily required that the block polymer (C) be synthesized from the polyester (A) and the compound (B).

As for the reaction ratio between the polyester (A) and the compound (B), by adjusting the amount of the polyester (A) to be (X+1) mol with respect to X mol of the compound (B), the block polymer (C) having carboxyl groups at both ends can be preferably obtained.

As for the reaction, after the completion of the synthesis reaction of the polyester (A) and without the thus synthesized polyester (A) being isolated, the compound (B) may be added to the reaction system and allowed to react with the polyester (A) as is.

In the polycondensation reaction, a catalyst which promotes esterification reaction may be used and, as such a catalyst, a conventionally known catalyst such as dibutyl tin oxide, tetraalkyl titanate, zirconium acetate or zinc acetate can be employed. Further, in order to inhibit oxidation of the product during the reaction, an antioxidant such as a phenolic antioxidant may also be added to the reaction system.

The polyester (A) may also contain a polyester consisting of only a diol and an aliphatic dicarboxylic acid and/or a polyester consisting of only a diol and an aromatic dicarboxylic acid, and these polyesters may be directly allowed to react with the compound (B) to obtain the block polymer (C).

In addition to the block constituted by the polyester (A) and the block constituted by the compound (B), the block polymer (C) may also contain, in its structure, a block constituted by a polyester consisting of only a diol and an aliphatic dicarboxylic acid and/or a block constituted by a polyester consisting of only a diol and an aromatic dicarboxylic acid.

It is preferred that the polymer compound (E) according to the present invention has a structure in which the block polymer (C) having a structure comprising carboxyl groups at both ends and the epoxy compound (D) having two or more epoxy groups are bound via an ester bond formed by a terminal carboxyl group of the block polymer (C) and an epoxy group of the epoxy compound (D). The polymer compound (E) may further comprise an ester bond formed by a carboxyl group of the polyester (A) and an epoxy group of the epoxy compound (D).

In order to obtain the polymer compound (E), the carboxyl groups of the block polymer (C) and the epoxy groups of the epoxy compound (D) can be allowed to react with each other. The number of the epoxy groups of the epoxy compound is preferably 0.5 to 5 equivalents, more preferably 0.5 to 1.5 equivalents, with respect to the number of the carboxyl groups of the block polymer (C) to be reacted. Further, the reaction can be performed in a variety of solvents, or it may be performed in a molten state.

The amount of the epoxy compound (D) having two or more epoxy groups to be used in the reaction is preferably 0.1 to 2.0 equivalents, more preferably 0.2 to 1.5 equivalents, with respect to the number of the carboxyl groups of the block polymer (C) to be reacted.

As for the reaction, after the completion of the synthesis reaction of the block polymer (C) and without the thus synthesized block polymer (C) being isolated, the epoxy compound (D) may be added to the reaction system and allowed to react with the block polymer (C) as is. In that case, unreacted carboxyl groups of the polyester (A) used in an excess amount in the synthesis of the block polymer (C) may react with some of the epoxy groups of the epoxy compound (D) to form ester bonds.

It is not necessarily required that a preferred polymer compound (E) of the present invention be synthesized from the block polymer (C) and the epoxy compound (D), as long as the polymer compound (E) has a structure that is equivalent to the one in which the block polymer (C) having a structure comprising carboxyl groups at both ends and the epoxy compound (D) having two or more epoxy groups are bound via an ester bond formed by a carboxyl group of the block polymer (C) and an epoxy group of the epoxy compound (D).

In the polymer compound (E) of the present invention, the block constituted by the polyester (A) has a number-average molecular weight of preferably 800 to 8,000, more preferably 1,000 to 6,000, still more preferably 2,000 to 4,000, in terms of polystyrene. Further, in the polymer compound (E), the block constituted by the compound (B) having hydroxyl groups at both ends has a number-average molecular weight of preferably 400 to 6,000, more preferably 1,000 to 5,000, still more preferably 2,000 to 4,000, in terms of polystyrene. Moreover, in the polymer compound (E), the block constituted by the block polymer (C) having a structure comprising carboxyl groups at both ends has a number-average molecular weight of preferably 5,000 to 25,000, more preferably 7,000 to 17,000, still more preferably 9,000 to 13,000, in terms of polystyrene.

The polymer compound (E) of the present invention may also be obtained by preparing the polyester (A) from a diol, an aliphatic dicarboxylic acid and an aromatic dicarboxylic acid and then allowing the polyester (A) to react with the compound (B) and/or the epoxy compound (D) without isolating the polyester (A).

The amount of the polymer compound (E) to be incorporated is 3 to 25 parts by mass with respect to 100 parts by mass of the thermoplastic resin and, from the standpoints of the persistence of antistatic performance and the organic solvent resistance, it is preferably 5 to 22 parts by mass, more preferably 7 to 20 parts by mass. When the amount of the polymer compound (E) is less than 3 parts by mass, sufficient antistaticity cannot be obtained, whereas when the amount is greater than 25 parts by mass, the mechanical properties of the resin may be adversely affected.

In the resin composition of the present invention, from the standpoints of the antistaticity and the persistence thereof, it is also preferred to incorporate at least one alkali metal salt (F).

However, in cases where the resin composition of the present invention is used for a container or pipe that is employed in the medical or food applications, the inclusion of a metal salt may not be preferable in the process of obtaining necessary approvals for the use of the container or pipe in the medical or food applications.

Examples of the alkali metal salt (F) include salts of organic acids and inorganic acids.

Examples of the alkali metal include lithium, sodium, potassium, cesium and rubidium. Examples of the organic acids include aliphatic monocarboxylic acids having 1 to 18 carbon atoms, such as formic acid, acetic acid, propionic acid, butyric acid and lactic acid; aliphatic dicarboxylic acids having 1 to 12 carbon atoms, such as oxalic acid, malonic acid, succinic acid, fumaric acid, maleic acid and adipic acid; aromatic carboxylic acids, such as benzoic acid, phthalic acid, isophthalic acid, terephthalic acid and salicylic acid; and sulfonic acids having 1 to 20 carbon atoms, such as methanesulfonic acid, p-toluenesulfonic acid, dodecylbenzenesulfonic acid and trifluoromethanesulfonic acid, and examples of the inorganic acids include hydrochloric acid, hydrobromic acid, sulfuric acid, sulfurous acid, phosphoric acid, phosphorous acid, polyphosphoric acid, nitric acid and perchloric acid. Thereamong, from the standpoint of the antistaticity, lithium, sodium and potassium are more preferred, and lithium and sodium are most preferred. Further, from the standpoint of the antistaticity, acetates, perchlorates, p-toluenesulfonates and dodecylbenzenesulfonates are preferred.

Specific examples of the alkali metal salt include lithium acetate, sodium acetate, potassium acetate, lithium chloride, sodium chloride, potassium chloride, lithium phosphate, sodium phosphate, potassium phosphate, lithium sulfate, sodium sulfate, lithium perchlorate, sodium perchlorate, potassium perchlorate, lithium p-toluenesulfonate, sodium p-toluenesulfonate, potassium p-toluenesulfonate, lithium dodecylbenzenesulfonate, sodium dodecylbenzenesulfonate, and potassium dodecylbenzenesulfonate. Thereamong, for example, lithium acetate, potassium acetate, lithium p-toluenesulfonate, sodium p-toluenesulfonate, lithium dodecylbenzenesulfonate, sodium dodecylbenzenesulfonate and lithium chloride are preferred.

From the standpoints of the persistence of antistatic performance and the organic solvent resistance, the amount of the alkali metal salt (F) to be incorporated can be 0.1 to 5 parts by mass, preferably 0.3 to 2 parts by mass, more preferably 0.4 to 1 parts by mass, with respect to 100 parts by mass of the thermoplastic resin. When the amount of the alkali metal salt is less than 0.1 parts by mass, sufficient antistaticity is not obtained, whereas when the amount is greater than 5 parts by mass, the alkali metal salt may affect the physical properties of the resin.

In the resin composition of the present invention, one or more Group II element salts may further be incorporated in such a range that does not impair the effects of the present invention.

However, in cases where the resin composition of the present invention is used for a container or pipe that is employed in the medical or food applications, the inclusion of a Group II element salt may not be preferable in the process of obtaining necessary approvals for the use of the container or pipe in the medical or food applications.

Examples of the Group II element salt include those of organic acids and inorganic acids, and examples of the Group II element include beryllium, magnesium, calcium, strontium and barium. Examples of the organic acids include aliphatic monocarboxylic acids having 1 to 18 carbon atoms, such as formic acid, acetic acid, propionic acid, butyric acid and lactic acid; aliphatic dicarboxylic acids having 1 to 12 carbon atoms, such as oxalic acid, malonic acid, succinic acid, fumaric acid, maleic acid and adipic acid; aromatic carboxylic acids, such as benzoic acid, phthalic acid, isophthalic acid, terephthalic acid and salicylic acid; and sulfonic acids having 1 to 20 carbon atoms, such as methanesulfonic acid, p-toluenesulfonic acid, dodecylbenzenesulfonic acid and trifluoromethanesulfonic acid. Examples of the inorganic acids include hydrochloric acid, hydrobromic acid, sulfuric acid, sulfurous acid, phosphoric acid, phosphorous acid, polyphosphoric acid, nitric acid, and perchloric acid.

From the standpoints of the persistence of antistatic performance and the organic solvent resistance, the amount of the Group II element salt(s) to be incorporated can also be 0.1 to 5 parts by mass, preferably 0.3 to 2 parts by mass, more preferably 0.4 to 1 parts by mass, with respect to 100 parts by mass of the thermoplastic resin. When the amount of the Group II element salt(s) is less than 0.1 parts by mass, sufficient antistaticity may not be attained, whereas when the amount is greater than 5 parts by mass, the Group II element salt(s) may affect the physical properties of the resin. In cases where the alkali metal salt (F) and a Group II element salt(s) are used in combination, the total amount thereof can be 0.1 to 5 parts by mass, preferably 0.3 to 2 parts by mass, more preferably 0.4 to 1 parts by mass, with respect to 100 parts by mass of the thermoplastic resin.

Further, in the resin composition of the present invention, a surfactant may also be incorporated in such a range that does not impair the effects of the present invention. As the surfactant, a nonionic, anionic, cationic or amphoteric surfactant can be used.

Examples of the nonionic surfactant include polyethylene glycol-type nonionic surfactants, such as higher alcohol ethylene oxide adducts, fatty acid ethylene oxide adducts, higher alkylamine ethylene oxide adducts and polypropylene glycol ethylene oxide adducts; and polyhydric alcohol-type nonionic surfactants, such as polyethylene oxides, glycerin fatty acid esters, pentaerythritol fatty acid esters, sorbitol or sorbitan fatty acid esters, polyhydric alcohol alkyl ethers and alkanolamine aliphatic amides.

Examples of the anionic surfactant include carboxylates, such as alkali metal salts of higher fatty acids; sulfates, such as higher alcohol sulfates and higher alkyl ether sulfates; sulfonates, such as alkylbenzenesulfonates, alkylsulfonates and paraffin sulfonates; and phosphates such as higher alcohol phosphates.

Examples of the cationic surfactant include quaternary ammonium salts such as alkyltrimethylammonium salts.

Examples of the amphoteric surfactant include amino acid-type amphoteric surfactants such as higher alkylaminopropionates; and betaine-type amphoteric surfactants, such as higher alkyl dimethylbetaines and higher alkyl dihydroxyethylbetaines. These surfactants may be used individually, or two or more thereof may be used in combination.

When a surfactant is incorporated, the amount thereof is preferably 0.1 to 5 parts by mass, more preferably 0.5 to 2 parts by mass, with respect to 100 parts by mass of the thermoplastic resin.

A polymer-type antistatic agent may also be incorporated into the resin composition of the present invention. As the polymer-type antistatic agent, for example, a known polymer-type antistatic agent such as a polyether ester amide can be used, and examples thereof include the polyether ester amide disclosed in Japanese Unexamined Patent Application Publication No. H7-10989 which comprises a polyoxyalkylene adduct of bisphenol A. Moreover, a block polymer having 2 to 50 repeating structures each composed of a polyolefin block and a hydrophilic polymer block can be used as well, and examples thereof include the block polymer disclosed in the specification of U.S. Pat. No. 6,552,131.

When a polymer-type antistatic agent is incorporated, the amount thereof is preferably 0.1 to 10 parts by mass, more preferably 0.5 to 5 parts by mass, with respect to 100 parts by mass of the thermoplastic resin.

Further, in the resin composition of the present invention, an ionic liquid may also be incorporated in such a range that does not impair the effects of the present invention. The ionic liquid is, for example, a normal temperature-molten salt having a melting point of not higher than room temperature and an initial electrical conductivity of 1 to 200 ms/cm, preferably 10 to 200 ms/cm, in which at least one cation or anion constituting the ionic liquid is an organic ion, and examples of such a normal temperature-molten salt include the one disclosed in WO 95/15572.

The cation constituting the ionic liquid is, for example, one selected from the group consisting of amidinium, pyridinium, pyrazolium and guanidinium cations. Thereamong, examples of the amidinium cation include the followings:
(1) imidazolinium cations
  those having 5 to 15 carbon atoms, such as 1,2,3,4-tetramethylimidazolinium and 1,3-dimethylimidazolinium;
(2) imidazolium cations
  those having 5 to 15 carbon atoms, such as 1,3-dimethylimidazolium and 1-ethyl-3-methylimidazolium;
(3) tetrahydropyrimidinium cations
  those having 6 to 15 carbon atoms, such as 1,3-dimethyl-1,4,5,6-tetrahydropyrimidinium and 1,2,3,4-tetramethyl-1,4,5,6-tetrahydropyrimidinium; and
(4) dihydropyrimidinium cations
  those having 6 to 20 carbon atoms, such as 1,3-dimethyl-1,4-dihydropyrimidinium, 1,3-dimethyl-1,6-dihydropyrimidinium, 8-methyl-1,8-diazabicyclo[5,4,0]-7,9-undecadienium and 8-methyl-1,8-diazabicyclo[5,4,0]-7,10-undecadienium.

Examples of the pyridinium cation include those having 6 to 20 carbon atoms, such as 3-methyl-1-propylpyridinium and 1-butyl-3,4-dimethylpyridinium.

Examples of the pyrazolium cation include those having 5 to 15 carbon atoms, such as 1,2-dimethylpyrazolium and 1-n-butyl-2-methylpyrazolium.

Examples of the guanidinium cation include the followings:
(1) guanidinium cations having an imidazolinium skeleton
  those having 8 to 15 carbon atoms, such as 2-dimethylamino-1,3,4-trimethylimidazolinium and 2-diethylamino-1,3,4-trimethylimidazolinium;
(2) guanidinium cations having an imidazolium skeleton
  those having 8 to 15 carbon atoms, such as 2-dimethylamino-1,3,4-trimethylimidazolium and 2-diethylamino-1,3,4-trimethylimidazolium;
(3) guanidinium cations having a tetrahydropyrimidinium skeleton
  those having 10 to 20 carbon atoms, such as 2-dimethylamino-1,3,4-trimethyl-1,4,5,6-tetrahydropyrimidinium and 2-diethylamino-1,3-dimethyl-4-ethyl-1,4,5,6-tetrahydropyrimidinium; and
(4) guanidinium cations having a dihydropyrimidinium skeleton
  those having 10 to 20 carbon atoms, such as 2-dimethylamino-1,3,4-trimethyl-1,4-dihydropyrimidinium, 2-dimethylamino-1,3,4-trimethyl-1,6-dihydropyrimidinium, 2-diethylamino-1,3-dimethyl-4-ethyl-1,4-dihydropyrimidinium and 2-diethylamino-1,3-dimethyl-4-ethyl-1,6-dihydropyrimidinium.

The above-described cations may be used individually, or two or more thereof may be used in combination. Thereamong, from the standpoint of the antistaticity, amidinium cations are preferred, imidazolium cations are more preferred, and 1-ethyl-3-methylimidazolium cation is particularly preferred.

In the ionic liquid, examples of the organic or inorganic acid constituting the anion include the followings. Examples of the organic acid include carboxylic acid, sulfuric acid ester, sulfonic acid and phosphoric acid ester, and examples of the inorganic acid include superacids (such as fluoroboric acid, tetrafluoroboric acid, perchloric acid, hexafluorophosphoric acid, hexafluoroantimonic acid and hexafluoroarsenic acid), phosphoric acid and boric acid. These organic and inorganic acids may be used individually, or two or more thereof may be used in combination.

Among these organic and inorganic acids, from the standpoint of the antistaticity of the ionic liquid, acids forming a conjugate base of superacid or an anion other than a conjugate base of super acid, which allow the anion constituting the ionic liquid to have a Hammett acidity function ($—H_0$) of 12 to 100, and mixtures of such acids are preferred.

Examples of the anion other than a conjugate base of superacid include halogen (such as fluorine, chlorine and bromine) ions, alkyl (C1 to C12) benzenesulfonic acid (such as p-toluenesulfonic acid and dodecylbenzenesulfonic acid) ions, and poly (n=1 to 25) fluoroalkanesulfonic acid (such as undecafluoropentanesulfonic acid) ions.

Examples of the superacid include those derived from a protonic acid or a combination of a protonic acid and a Lewis acid, and mixtures thereof. Examples of the protonic acid used as the superacid include bis(trifluoromethylsulfonyl)imidic acid, bis(pentafluoroethylsulfonyl)imidic acid, tris(trifluoromethylsulfonyl)methane, perchloric acid, fluorosulfonic acid, alkane (C1 to C30) sulfonic acids (such as methanesulfonic acid and dodecanesulfonic acid), poly (n=1 to 30) fluoroalkane (C1 to C30) sulfonic acid (such as trifluoromethanesulfonic acid, pentafluoroethanesulfonic acid, heptafluoropropanesulfonic acid, nonafluorobutanesulfonic acid, undecafluoropentanesulfonic acid and tridecafluorohexanesulfonic acid), fluoroboric acid, and tetrafluoroboric acid. Thereamong, from the standpoint of the ease of synthesis, fluoroboric acid, trifluoromethanesulfonic acid, bis(trifluoromethanesulfonyl)imidic acid and bis(pentafluoroethylsulfonyl)imidic acid are preferred.

Examples of the protonic acid used in combination with a Lewis acid include hydrogen halides (such as hydrogen fluoride, hydrogen chloride, hydrogen bromide and hydrogen iodide), perchloric acid, fluorosulfonic acid, methanesulfonic acid, trifluoromethanesulfonic acid, pentafluoroethanesulfonic acid, nonafluorobutanesulfonic acid, undecafluoropentanesulfonic acid, tridecafluorohexanesulfonic acid, and mixtures thereof. Thereamong, from the standpoint of the initial electrical conductivity of the ionic liquid, hydrogen fluoride is preferred.

Examples of the Lewis acid include boron trifluoride, phosphorus pentafluoride, antimony pentafluoride, arsenic pentafluoride, tantalum pentafluoride, and mixtures thereof. Thereamong, from the standpoint of the initial electrical conductivity of the ionic liquid, boron trifluoride and phosphorus pentafluoride are preferred.

The combination of a protonic acid and a Lewis acid may be any combination, and examples of a superacid derived therefrom include tetrafluoroboric acid, hexafluorophosphoric acid, hexafluorotantalic acid, hexafluoroantimonic acid, hexafluorotantalum sulfonic acid, tetrafluoroboric acid, hexafluorophosphoric acid, chlorotrifluoroboric acid, hexafluoroarsenic acid, and mixtures thereof.

Among the above-described anions, from the standpoint of the antistaticity of the ionic liquid, conjugate bases of superacids (superacids derived from a protonic acid and superacids derived from a combination of a protonic acid and a Lewis acid) are preferred, and conjugate bases of superacids derived from a protonic acid and superacids derived from a protonic acid, boron trifluoride and/or a phosphorus pentafluoride are more preferred.

Among the above-described ionic liquids, from the standpoint of the antistaticity, amidinium cation-containing ionic liquids are preferred, 1-ethyl-3-methylimidazolium cation-containing ionic liquids are more preferred, and 1-ethyl-3-methylimidazolium-bis(trifluoromethanesulfonyl)imide is particularly preferred.

When an ionic liquid is incorporated, the amount thereof is preferably 0.01 to 5 parts by mass, more preferably 0.1 to 3 parts by mass, with respect to 100 parts by mass of the thermoplastic resin.

Still further, in the resin composition of the present invention, a compatibilizer may be incorporated in such a range that does not impair the effects of the present invention. By incorporating a compatibilizer, the compatibility of the antistatic component with other components and the resin component can be improved. Examples of the compatibilizer include modified vinyl polymers having at least one functional group (polar group) selected from the group consisting of a carboxyl group, an epoxy group, an amino group, a hydroxyl group and a polyoxyalkylene group, such as the polymer disclosed in Japanese Unexamined Patent Application Publication No. H3-258850, the sulfonyl group-containing modified vinyl polymer disclosed in Japanese Unexamined Patent Application Publication No. H6-345927 and block polymers comprising a polyolefin moiety and an aromatic vinyl polymer moiety.

When a compatibilizer is incorporated, the amount thereof is preferably 0.01 to 5 parts by mass, more preferably 0.1 to 3 parts by mass, with respect to 100 parts by mass of the thermoplastic resin.

Moreover, in the resin composition of the present invention, as required, a variety of additives such as a phenolic antioxidant, a phosphorus-based antioxidant, a thioether-based antioxidant, an ultraviolet absorber and a hindered amine-based light stabilizer may also be incorporated in such a range that does not impair the effects of the present invention. By this, the resin composition of the present invention can be stabilized.

Examples of the phenolic antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl)propionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tort-butyl-4-hydroxyphenyl)propionate, tetrakis[3-(3,5-di-tert-butyl-4-hydroxyphenyl)propionic acid methyl]methane, thiodiethylene glycol-bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol-bis[(3-tert-butyl-4-hydroxy-5-methylphenyl)propionate]. These phenolic antioxidants are added in an amount of preferably 0.001 to 10 parts by mass, more preferably 0.05 to 5 parts by mass, with respect to 100 parts by mass of the thermoplastic resin.

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis(4,6-di-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphite of 2-ethyl-2-butylpropylene glycol and 2,4,6-tri-tert-butylphenol. These phosphorus-based antioxidants are added in an amount of preferably 0.001 to 10 parts by mass, more preferably 0.05 to 5 parts by mass, with respect to 100 parts by mass of the thermoplastic resin.

Examples of the thioether-based antioxidant include dialkyl thiodipropionates, such as dilauryl thiodipropionate, dimyristyl thiodipropionate and distearyl thiodipropionate; and pentaerythritol-tetra(β-alkylthiopropionic acid)esters. These thioether-based antioxidants are added in an amount of preferably 0.001 to 10 parts by mass, more preferably 0.05 to 5 parts by mass, with respect to 100 parts by mass of the thermoplastic resin.

Examples of the ultraviolet absorber include 2-hydroxybenzophenones, such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2'-hydroxyphenyl)benzotriazoles, such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'- dicumylphenyl)benzotriazole, 2,2'-methylene-bis(4-tert-octyl-6-(benzotriazolyl)phenol) and 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl-α-cyano-β,β-diphenyl acrylate and methyl-2-cyano-3-methyl-3-(p-methoxyphenyl)acrylate; and triaryl triazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. These ultraviolet absorbers are added in an amount of preferably 0.001 to 30 parts by mass, more preferably 0.05 to 10 parts by mass, with respect to 100 parts by mass of the thermoplastic resin.

Examples of the hindered amine-based light stabilizer include hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-oxtoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazin e polycondensate, 1,5,8,12-tetrakis[2,4-bis(N-butyl-N-(2,2,6,6-tetramethyl-4-piperidyl)amino)-s-triazine-6-yl]-1, 5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoun decane and 1,6,11-tris[2,4-bis(N-butyl-N-(1,2,2,6,6-pentamethyl-4-piperidyl)amino)-s-triazine-6-yl]amino undecane. These hindered amine-based light stabilizers are added in an amount of preferably 0.001 to 30 parts by mass, more preferably 0.05 to 10 parts by mass, with respect to 100 parts by mass of the thermoplastic resin.

It is preferred to further add a known neutralizer as required for the purpose of neutralizing residual catalyst contained in the thermoplastic resin. Examples of the neutralizer include fatty acid metal salts, such as calcium stearate, lithium stearate and sodium stearate; and fatty acid amide compounds, such as ethylene-bis(stearamide), ethylene-bis(12-hydroxystearamide) and stearic acid amide, and these neutralizers may be used in the form of a mixture.

Further, in the resin composition of the present invention, as required, for example, a nucleating agent (e.g., an aromatic metal carboxylate, an alicyclic metal alkylcarboxylate, aluminum p-tert-butylbenzoate, an aromatic metal phosphate, or a kind of dibenzylidene sorbitol), a metallic soap, a hydrotalcite, a triazine ring-containing compound, a metal hydroxide, a phosphoric acid ester-based flame retardant, a condensed phosphoric acid ester-based flame retardant, a phosphate-based flame retardant, an inorganic phosphorus-based flame retardant, a (poly)phosphate-based flame retardant, a halogen-based flame retardant, a silicon-based flame retardant, an antimony oxide such as antimony trioxide, other inorganic flame retardant aid, other organic flame retardant aid, a filler, a pigment, a lubricant, and/or a foaming agent, may also be added.

Examples of the triazine ring-containing compound include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxide include magnesium hydroxide, aluminum hydroxide, calcium hydroxide, barium hydroxide, zinc hydroxide and KISUMA® 5A (magnesium hydroxide, manufactured by Kyowa Chemical Industry Co., Ltd.).

Examples of the phosphate-based flame retardant include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris(isopropylphenyl) phosphate, 2-ethylhexyldiphenyl phosphate, t-butylphenyldiphenyl phosphate, bis(t-butylphenyl) phenyl phosphate, tris(t-butylphenyl)phosphate, isopropylphenyldiphenyl phosphate, bis(isopropylphenyl) diphenyl phosphate, and tris(isopropylphenyl)phosphate.

Examples of the condensed phosphoric acid ester-based flame retardant include 1,3-phenylene-bis(diphenylphosphate), 1,3-phenylene-bis(dixylenylphosphate), and bisphenol A-bis(diphenylphosphate).

Examples of the (poly)phosphate-based flame retardant include ammonium salts and amine salts of (poly)phosphoric acid, such as ammonium polyphosphate, melamine polyphosphate, piperazine polyphosphate, melamine pyrophosphate and piperazine pyrophosphate.

Examples of the above-described other inorganic flame retardant aid include inorganic compounds such as titanium oxide, aluminum oxide, magnesium oxide, hydrotalcites, talc and montmorillonite, and surface-treated products thereof. For example, a variety of commercially available products, such as TIPAQUE® R-680 (titanium oxide: manufactured by Ishihara Sangyo Kaisha, Ltd.), KYOWAMAG® 150 (magnesium oxide: manufactured by Kyowa Chemical Industry Co., Ltd.), DHT-4A® (hydrotalcite: manufactured by Kyowa Chemical Industry Co., Ltd.) and ALCAMIZER® 4 (zinc-modified hydrotalcite: manufactured by Kyowa Chemical Industry Co., Ltd.), can be used. Examples of the above-described other organic flame retardant aid include pentaerythritol.

In addition, in the resin composition of the present invention, as required, an additive(s) normally used in thermoplastic resins, for example, a cross-linking agent, an anti-fogging agent, an anti-plate-out agent, a surface treatment agent, a plasticizer, a lubricant, a flame retardant, a fluorescent agent, an antifungal agent, an antibacterial agent, a foaming agent, a metal inactivator, a mold-release agent, a pigment, a processing aid, an antioxidant and/or a light stabilizer, may also be incorporated in such a range that does not impair the effects of the present invention.

The method of producing the resin composition of the present invention is not particularly restricted, and any commonly used method can be employed as long as the polymer compound (E), the alkali metal salt (F) and other arbitrary components are incorporated into a thermoplastic resin. For example, such components can be mixed and kneaded into the thermoplastic resin by roll kneading or bumper kneading, or using an extruder, a kneader or the like.

The polymer compound (E) may be directly added; however, as required, the polymer compound (E) may be impregnated into a carrier before the addition. In order to impregnate the polymer compound (E) into a carrier, the polymer compound (E) and the carrier can be directly heat-mixed, or a method in which the polymer compound (E) is diluted with an organic solvent before impregnated into the carrier and the solvent is subsequently removed can be employed as required. As the carrier, one which is known as a filler or bulking agent of a synthetic resin, or a flame retardant or light stabilizer that is solid at normal temperature can be employed, and examples of such a carrier include calcium silicate powder, silica powder, talc powder, alumina powder, titanium oxide powder and these carriers having a chemically modified surface, as well as the below-described flame retardants and antioxidants that are solid. Thereamong, those carriers having a chemically modified surface are preferred, and silica powder having a chemically modified surface is more preferred. These carriers have an average particle size of preferably 0.1 to 100 μm, more preferably 0.5 to 50 μm.

As a method of incorporating the polymer compound (E) into a resin component, the polymer compound (E) may be synthesized while kneading the block polymer (C) and the epoxy compound (D) into the resin component and, in this process, the alkali metal salt (F) may also be kneaded at the same time as required. Alternatively, the polymer compound (E) may be incorporated using a method of obtaining a molded article by mixing the polymer compound (E) with the resin component and, as required, the alkali metal salt (F) at the time of molding such as injection molding, or a masterbatch of the thermoplastic resin and, as required, the alkali metal salt (F), which masterbatch has been produced in advance, may be incorporated.

The container and the pipe for organic solvents according to the present invention will now be described.

The container and the pipe for organic solvents according to the present invention are obtained by molding the resin composition of the present invention. By molding the resin composition of the present invention, a resin molded article having antistaticity can be obtained. The molding method is not particularly restricted, and examples thereof include extrusion processing, calender processing, injection molding, rolling, compression molding, blow molding, and rotational molding. Molded articles of various shapes, such as resin plates, sheets, films, bottles, fibers and special shape articles, can be produced by these methods. Such molded articles obtained from the resin composition of the present invention exhibit excellent antistatic performance with excellent persistence. Further, the molded articles also have wiping resistance.

Further, molded articles obtained from the resin composition of the present invention have long-lasting antistaticity and exhibit persistent antistatic performance without elution of an antistatic component even when the molded articles are in contact with an organic solvent for a long period of time.

Examples of organic solvents that can be used in the container and the pipe of the present invention include known organic solvents, among which flammable or ignitable organic solvents are particularly preferred.

Examples of such organic solvents include alcohol solvents, diol solvents, ketone solvents, ester solvents, ether solvents, aliphatic or alicyclic hydrocarbon solvents, aromatic hydrocarbon solvents, cyano group-containing hydrocarbon solvents, petroleum solvents, halogen solvents, and other solvents.

Examples of the alcohol solvents include methanol, ethanol, propanol, isopropanol, 1-butanol, isobutanol, 2-butanol, tert-butanol, pentanol, isopentanol, 2-pentanol, neopentanol, tert-pentanol, hexanol, 2-hexanol, heptanol, 2-heptanol, octanol, 2-ethylhexanol, 2-octanol, cyclopentanol, cyclohexanol, cycloheptanol, methylcyclopentanol, methylcyclohexanol, methylcycloheptanol, benzyl alcohol, ethylene glycol monoacetate, ethylene glycol monoethyl ether, ethylene glycol monophenyl ether, ethylene glycol monobutyl ether, ethylene glycol monomethyl ether, propylene glycol monomethyl ether, propylene glycol monoethyl ether, diethylene glycol monomethyl ether, diethylene glycol monoethyl ether, dipropylene glycol monomethyl ether, dipropylene glycol monoethyl ether, dipropylene glycol monobutyl ether, 2-(2-methoxyethoxy)ethanol, 2-(N,N-dimethylamino)ethanol, 3-(N,N-dimethylamino)propanol, and rubbing alcohol.

Examples of the diol solvents include ethylene glycol, propylene glycol, 1,2-butanediol, 1,3-butanediol, 1,4-butanediol, 1,5-pentanediol, neopentyl glycol, isoprene glycol (3-methyl-1,3-butanediol), 1,2-hexanediol, 1,6-hexanediol, 3-methyl-1,5-pentanediol, 1,2-octanediol, octanediol (2-ethyl-1,3-hexanediol), 2-butyl-2-ethyl-1,3-propanediol, 2,5-dimethyl-2,5-hexanediol, 1,2-cyclohexanediol, 1,4-cyclohexanediol, and 1,4-cyclohexanedimethanol.

Examples of the ketone solvents include acetone, ethyl methyl ketone, methyl butyl ketone, methyl isobutyl ketone, ethyl butyl ketone, dipropyl ketone, diisobutyl ketone, methyl amyl ketone, cyclohexanone, and methylcyclohexanone.

Examples of the ester solvents include methyl formate, ethyl formate, methyl acetate, ethyl acetate, isopropyl acetate, butyl acetate, isobutyl acetate, sec-butyl acetate, tert-butyl acetate, amyl acetate, isoamyl acetate, tert-amyl acetate, phenyl acetate, methyl propionate, ethyl propionate, isopropyl propionate, butyl propionate, isobutyl propionate, sec-butyl propionate, tert-butyl propionate, amyl propionate, isoamyl propionate, tert-amyl propionate, phenyl propionate, methyl 2-ethylhexanoate, ethyl 2-ethylhexanoate, propyl 2-ethylhexanoate, isopropyl 2-ethylhexanoate, butyl 2-ethylhexanoate, methyl lactate, ethyl lactate, methyl methoxypropionate, methyl ethoxypropionate, ethyl methoxypropionate, ethyl ethoxypropionate, ethylene glycol monomethyl ether acetate, diethylene glycol monomethyl ether acetate, ethylene glycol monoethyl ether acetate, ethylene glycol monopropyl ether acetate, ethylene glycol monoisopropyl ether acetate, ethylene glycol monobutyl ether acetate, ethylene glycol mono-sec-butyl ether acetate, ethylene glycol monoisobutyl ether acetate, ethylene glycol mono-tert-butyl ether acetate, propylene glycol monomethyl ether acetate, propylene glycol monoethyl ether acetate, propylene glycol monopropyl ether acetate, propylene glycol monoisopropyl ether acetate, propylene glycol monobutyl ether acetate, propylene glycol mono-sec-butyl ether acetate, propylene glycol monoisobutyl ether acetate, propylene glycol mono-tert-butyl ether acetate, butylene glycol monomethyl ether acetate, butylene glycol monoethyl ether acetate, butylene glycol monopropyl ether acetate, butylene glycol monoisopropyl ether acetate, butylene glycol monobutyl ether acetate, butylene glycol mono-sec-butyl ether acetate, butylene glycol monoisobutyl ether acetate, butylene glycol mono-tert-butyl ether acetate, methyl acetoacetate, ethyl acetoacetate, methyl oxobutanoate, ethyl oxobutanoate, γ-lactone, and δ-lactone.

Examples of the ether solvents include tetrahydrofuran, tetrahydropyran, morpholine, ethylene glycol dimethyl ether, diethylene glycol dimethyl ether, triethylene glycol dimethyl ether, dibutyl ether, diethyl ether, and dioxane.

Examples of the aliphatic or alicyclic hydrocarbon solvents include pentane, hexane, cyclohexane, methylcyclohexane, dimethylcyclohexane, ethylcyclohexane, heptane, octane, decaline, and solvent naphtha.

Examples of the aromatic hydrocarbon solvents include benzene, toluene, ethylbenzene, xylene, mesitylene, diethylbenzene, cumene, isobutylbenzene, cymene, and tetralin.

Examples of the petroleum solvents include mineral spirit, kerosene, and thinners.

Examples of the halogen solvents include methylene chloride, chloroform, 1,2-dichloroethane, trichloroethylene, and tetrachloroethylene.

Examples of the cyano group-containing hydrocarbon solvents include acetonitrile, 1-cyanopropane, 1-cyanobutane, 1-cyanohexane, cyanocyclohexane, cyanobenzene, 1,3-dicyanopropane, 1,4-dicyanobutane, 1,6-dicyanohexane, 1,4-dicyanocyclohexane, and 1,4-dicyanobenzene.

Examples of organic solvents include N-methyl-2-pyrrolidone, dimethyl sulfoxide, dimethylformamide, dimethylacetamide, sulfolane, acetic acid, acetic anhydride, and glacial acetic acid.

In the present invention, examples of organic solvents also include liquid fuels, and such fuels are also preferably used in the container and the pipe.

Examples of the fuels include petroleum, shale oil, kerosene, gasoline, diesel oil, heavy oil, jet fuel, naphtha, benzin, liquefied natural gas, liquefied petroleum gas, liquefied propane gas, and liquefied shale gas.

Further, in the present invention, examples of organic solvents also include naturally occurring oils, such as vegetable oils and animal oils. These oils include both edible and industrial oils. Examples of the edible oils include canola oil, coconut oil, corn oil, cottonseed oil, olive oil, palm oil, palm kernel oil, peanut oil, rapeseed oil, safflower oil, sesame oil, soybean oil, sunflower oil, almond oil, linseed oil, grape seed oil, perilla oil, rice-bran oil, beef tallow, lard and fish oil, and examples of the industrial oils include tung oil, linseed oil and castor oil.

The above-described organic solvents may be used individually, or two or more thereof may be used in combination. Further, a component other than an organic solvent may be dissolved or mixed therein. Moreover, these organic solvents may be mixed with water.

The container and the pipe of the present invention can also be used in a piping of a flammable gas such as natural gas, propane gas, utility gas or shale gas.

The shape and size of the container of the present invention are not particularly restricted as long as an organic solvent can be stored therein. The container may be in the form of a bottle or a bag. The container may be equipped with a lid obtained from the resin composition of the present invention.

Specific examples of the container include fuel tanks, fuel containers, chemical containers, disinfectant containers, rubbing alcohol containers, spray containers, cosmetic containers, cooking oil containers, and food containers.

The pipe of the present invention is not particularly restricted as long as it has a hollow shape and an organic solvent can be passed therethrough. Examples of the pipe include tubes, cylinders, hose, and pipes.

Specific examples of the pipe include medical tubes, food tubes, industrial pipes, fuel hose, and fuel pipes.

[Antistatic Fiber]

The antistatic polyolefin fiber of the present invention and the fabric of the present invention which comprises the antistatic polyolefin fiber will now be described in detail.

First, the antistatic polyolefin fiber of the present invention will be described. The antistatic polyolefin fiber of the present invention comprises a resin composition containing 1 to 40 parts by mass of at least one polymer compound (L) with respect to 100 parts by mass of a polyolefin resin. In the antistatic fiber of the present invention, the polymer compound (L) has a structure in which a diol, an aliphatic dicarboxylic acid, an aromatic dicarboxylic acid, a compound (I) which comprises at least one group represented by the following Formula (1) and has hydroxyl groups at both ends, and a compound (K) having a reactive functional group are bound via ester bonds:

—CH$_2$—CH$_2$—O—　　(1)

The polyolefin resin used in the present invention will now be described.

The polyolefin resin used in the resin composition according to the antistatic fiber of the present invention is not particularly restricted. Examples of the polyolefin resin include α-olefin polymers, such as low-density polyethylenes, linear low-density polyethylenes, high-density polyethylenes, homopolypropylenes, random copolymer polypropylenes, block copolymer polypropylenes, isotactic polypropylenes, syndiotactic polypropylenes, hemi-isotactic polypropylenes, polybutenes, cycloolefin polymers, stereo block polypropylenes, poly-3-methyl-1-butene, poly-3-methyl-1-pentene and poly-4-methyl-1-pentene; α-olefin copolymers, such as ethylene-propylene block or random copolymers, impact copolymer polypropylenes, ethylene-methyl methacrylate copolymers, ethylene-methyl acrylate copolymers, ethylene-ethyl acrylate copolymers, ethylene-butyl acrylate copolymers and ethylene-vinyl acetate copolymers; and polyolefin-based thermoplastic elastomers, and these polyolefin resins may each be a copolymer of two or more polymers/elastomers. These polyolefin resins may be used in a combination of two or more thereof. In the present invention, the polyolefin resin is particularly preferably polypropylene or polyethylene.

The above-exemplified polyolefin resins can be used regardless of, for example, molecular weight, polymerization degree, density, softening point, ratio of solvent-insoluble component(s), degree of stereoregularity, presence or absence of catalyst residue, type and blend ratio of each material monomer, type of polymerization catalyst (e.g., a Ziegler catalyst or a metallocene catalyst).

Next, the polymer compound (L) used in the present invention will be described. The polymer compound (L) is incorporated for the purpose of imparting antistaticity to the antistatic fiber of the present invention.

As described above, the polymer compound (L) used in the present invention has a structure in which a diol, an aliphatic dicarboxylic acid, an aromatic dicarboxylic acid, a compound (I) which comprises at least one group represented by the following Formula (1) and has hydroxyl groups at both ends, and a compound (K) having a reactive functional group are bound via ester bonds:

—CH$_2$—CH$_2$—O—　　(1)

The polymer compound (L) can be obtained by allowing a diol, an aliphatic dicarboxylic acid, an aromatic dicarboxylic acid, a compound (I) which comprises at least one group represented by the Formula (1) and has hydroxyl groups at both ends, and a compound (K) having a reactive functional group to undergo an esterification reaction.

First, the diol used in the polymer compound (L) of the present invention will be described.

Examples of the diol used in the present invention include aliphatic diols and aromatic group-containing diols. Two or more of these diols may be used as a mixture. Examples of the aliphatic diols include 1,2-ethanediol (ethylene glycol), 1,2-propanediol (propylene glycol), 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, 1,4-cyclohexane dimethanol, hydrogenated bisphenol A, 1,2-, 1,3- or 1,4-cyclohexanediol, cyclododecanediol, dimer diol, hydrogenated dimer diol, diethylene glycol, dipropylene glycol, triethylene glycol, and polyethylene glycol. Among these aliphatic diols, 1,4-cyclohexane dimethanol and hydrogenated bisphenol A are preferred from the standpoints of antistaticity and inhibition of ion elution, and 1,4-cyclohexane dimethanol is more preferred.

The aliphatic diols are preferably hydrophobic; therefore, among aliphatic diols, hydrophilic polyethylene glycols are not preferred. This, however, does not apply to those cases where they are used in combination with other diol.

Examples of the aromatic group-containing diols include polyhydroxyethyl adducts of mononuclear dihydric phenol compounds, such as bisphenol A, 1,2-hydroxybenzene, 1,3-hydroxybenzene, 1,4-hydroxybenzene, 1,4-benzenedimethanol, bisphenol A-ethylene oxide adduct, bisphenol A-propylene oxide adduct, 1,4-bis(2-hydroxyethoxy)benzene, resorcin and pyrocatechol. Among these aromatic group-containing diols, bisphenol A-ethylene oxide adduct and 1,4-bis(β-hydroxyethoxy)benzene are preferred.

Examples of the aliphatic dicarboxylic acid and the aromatic dicarboxylic acid that can be in the polymer compound (L) of the present invention include the same ones as those exemplified above for the polymer compound (E).

Examples of the compound (I) that can be in the present invention, which comprises at least one group represented by the Formula (1) and has hydroxyl groups at both ends, include the same ones as those exemplified above for the compound (B) used in the polymer compound (E).

Next, the compound (K) used in the present invention, which has a reactive functional group, will be described. In the present invention, the compound (K) having a reactive functional group is not particularly restricted as long as it has a reactive functional group, and examples thereof include compounds having a carboxyl group, a hydroxyl group, an amino group, an amide group, an epoxy group and/or the like. In the antistatic fiber of the present invention, an epoxy compound (K-1) having two or more epoxy groups as reactive functional groups and a polyhydric alcohol compound (K-2) having three or more hydroxyl groups as reactive functional groups are preferred.

Examples of the epoxy compound (K-1) that can be in the present invention include the same ones as those exemplified above for the compound (D) used in the polymer compound (E).

The polyhydric alcohol compound (K-2) used in the present invention is not particularly restricted as long as it has three or more hydroxyl groups, and examples of such a polyhydric alcohol compound include trihydric alcohols, such as glycerin, 1,2,3-butanetriol, 1,2,4-butanetriol, 2-methyl-1,2,3-propanetriol, 1,2,3-pentanetriol, 1,2,4-pentanetriol, 1,3,5-pentanetriol, 2,3,4-pentanetriol, 2-methyl-2,3,4-butanetriol, trimethylolethane, 2,3,4-hexanetriol, 2-ethyl-1,2,3-butanetriol, trimethylolpropane, 4-propyl-3,4,5-heptanetriol, 2,4-dimethyl-2,3,4-pentanetriol, triethanolamine, triisopropanolamine and 1,3,5-tris(2-hydroxyethyl)isocyanurate; tetrahydric alcohols, such as pentaerythritol, 1,2,3,4-pentanetetrol, 2,3,4,5-hexanetetrol, 1,2,4,5-pentanetetrol, 1,3,4,5-hexanetetrol, diglycerin, ditrimethylolpropane, sorbitan, N,N,N',N'-tetrakis(2-hydroxypropyl)ethylene diamine and N,N,N',N'-tetrakis(2-hydroxyethyl)ethylene diamine; pentahydric alcohols, such as adonitol, arabitol, xylitol and triglycerin; hexahydric alcohols, such as dipentaerythritol, sorbitol, mannitol, iditol, inositol, dulcitol, talose and allose; and tripentaerythritol. The molecular weight of the polyhydric alcohol compound is not particularly restricted, a high-molecular-weight polyhydric alcohol such as polypentaerythritol or polyvinyl alcohol, or a synthetic polyhydric alcohol such as polyester polyol can also be used. As the polyhydric alcohol compound (K-2), two or more of these alcohol compounds may be used in combination.

From the standpoints of the persistence of antistatic performance and the water resistance, it is preferred that the polymer compound (L) has a structure in which a polyester (H), which is constituted by a diol, an aliphatic dicarboxylic acid and an aromatic dicarboxylic acid, the compound (I) and the compound (K) having a reactive functional group are bound via ester bonds.

Further, from the standpoints of the persistence of antistatic performance and the water resistance, it is also preferred that the polymer compound (L) has a structure in which a block polymer (J) having carboxyl groups at both ends and the compound (K) having a reactive functional group are bound via an ester bond, the block polymer (J) comprising a block constituted by the polyester (H) constituted by a diol, an aliphatic dicarboxylic acid and an aromatic dicarboxylic acid and a block constituted by the compound (I), which blocks are repeatedly and alternately bound via ester bonds.

Examples of the polyester (H) that can be used in the present invention include the same ones as those exemplified above for the polyester (A).

The compound (I) having hydroxyl groups at both ends may be any compound as long as it reacts with the polyester (H) to form an ester bond and thereby constitutes the structure of the block polymer (J), and the hydroxyl groups at both ends may be protected or modified, or may be in a precursor form.

The block polymer (J) according to the present invention, which has a structure comprising carboxyl groups at both ends, contains a block constituted by the polyester (H) and a block constituted by the compound (I) and has a structure in which these blocks are repeatedly and alternately bound via ester bonds formed by carboxyl groups and hydroxyl groups. Examples of the block polymer (J) that can be used include the same ones as those exemplified above for the block polymer (C) used in the polyester (A).

As for the reaction ratio between the polyester (H) and the compound (I), by adjusting the amount of the polyester (H) to be (X+1) mol with respect to X mol of the compound (I), the block polymer (J) having carboxyl groups at both ends can be preferably obtained.

As for the reaction, after the completion of the synthesis reaction of the polyester (H) and without the thus synthesized polyester (H) being isolated, the compound (I) may be added to the reaction system and allowed to react with the polyester (H) as is.

In the polycondensation reaction, a catalyst which promotes esterification reaction may be used and, as such a catalyst, a conventionally known catalyst such as dibutyl tin oxide, tetraalkyl titanate, zirconium acetate or zinc acetate can be employed. Further, in order to inhibit oxidation of the product during the reaction, an antioxidant such as a phenolic antioxidant may also be added to the reaction system.

The polyester (H) may also contain a polyester consisting of only a diol and an aliphatic dicarboxylic acid and/or a polyester consisting of only a diol and an aromatic dicarboxylic acid, and these polyesters may be directly allowed to react with the compound (I) to obtain the block polymer (J).

In addition to the block constituted by the polyester (H) and the block constituted by the compound (I), the block polymer (J) may also contain, in its structure, a block constituted by a polyester consisting of only a diol and an aliphatic dicarboxylic acid and/or a block constituted by a polyester consisting of only a diol and an aromatic dicarboxylic acid.

It is preferred that the polymer compound (L) according to the present invention has a structure in which the block polymer (J) having a structure comprising carboxyl groups at both ends and the compound (K) having a reactive functional group are bound via an ester bond formed by a terminal carboxyl group of the block polymer (J) and a reactive functional group of the compound (K). The polymer compound (L) may further comprise an ester bond formed by a carboxyl group of the polyester (H) and a reactive functional group of the compound (K).

When the epoxy compound (K-1) is used as the compound (K) having a reactive functional group, the polymer compound (L) has a structure in which the block polymer (J) having a structure comprising carboxyl groups at both ends and the epoxy compound (K-1) having two or more epoxy groups are bound via an ester bond formed by a terminal carboxyl group of the block polymer (J) and an epoxy group of the epoxy compound (K-1). It is noted here that, as described above, the polymer compound (L) may further contain an ester bond formed by a carboxyl group of the polyester (H) and an epoxy group of the epoxy compound (K-1).

In order to obtain the polymer compound (L), the carboxyl groups of the block polymer (J) and the epoxy groups of the epoxy compound (K-1) can be allowed to react with each other. The number of the epoxy groups of the epoxy compound is preferably 0.5 to 5 equivalents, more preferably 0.5 to 1.5 equivalents, with respect to the number of the carboxyl groups of the block polymer (J) to be reacted. Further, the reaction can be performed in a variety of solvents, or it may be performed in a molten state.

The amount of the epoxy compound (K-1) having two or more epoxy groups to be used in the reaction is preferably 0.1 to 2.0 equivalents, more preferably 0.2 to 1.5 equivalents, with respect to the number of the carboxyl groups of the block polymer (J) to be reacted.

As for the reaction, after the completion of the synthesis reaction of the block polymer (J) and without the thus synthesized block polymer (J) being isolated, the epoxy compound (K-1) may be added to the reaction system and allowed to react with the block polymer (J) as is. In this case, unreacted carboxyl groups of the polyester (1-1) used in an excess amount in the synthesis of the block polymer (J) may react with some of the epoxy groups of the epoxy compound (K-1) to form ester bonds.

It is not necessarily required that a preferred polymer compound (L) of the present invention be synthesized from the block polymer (J) and the epoxy compound (K-1), as long as the polymer compound (L) has a structure that is equivalent to the one in which the block polymer (J) having a structure comprising carboxyl groups at both ends and the epoxy compound (K-1) having two or more epoxy groups are bound via an ester bond formed by a carboxyl group of the block polymer (J) and an epoxy group of the epoxy compound (K-1).

When the polyhydric alcohol compound (K-2) is used as the compound (K) having a reactive functional group, the polymer compound (L) has a structure in which the block polymer (J) having a structure comprising carboxyl groups at both ends and the polyhydric alcohol compound (K-2) having three or more hydroxyl groups are bound via an ester bond formed by a terminal carboxyl group of the block polymer (J) and a hydroxyl group of the polyhydric alcohol compound (K-2). It is noted here that, as described above, the polymer compound (L) may further contain an ester bond formed by a carboxyl group of the polyester (H) and a hydroxyl group of the polyhydric alcohol compound (K-2).

In order to obtain the polymer compound (L), the carboxyl groups of the block polymer (J) and the hydroxyl groups of the polyhydric alcohol compound (K-2) can be allowed to react with each other. The number of the hydroxyl groups of the polyhydric alcohol compound to be reacted is preferably 0.5 to 5.0 equivalents, more preferably 0.5 to 2.0 equivalents, with respect to the number of the carboxyl groups of the block polymer (J) to be reacted. The reaction can be performed in a variety of solvents, or it may be performed in a molten state.

The amount of the polyhydric alcohol compound (K-2) having three or more hydroxyl groups to be used in the reaction is preferably 0.1 to 2.0 equivalents, more preferably 0.2 to 1.5 equivalents, with respect to the number of the carboxyl groups of the block polymer (J) to be reacted.

As for the reaction, after the completion of the synthesis reaction of the block polymer (J) and without the thus synthesized block polymer (J) being isolated, the polyhydric alcohol compound (K-2) may be added to the reaction system and allowed to react with the block polymer (J) as is. In this case, unreacted carboxyl groups of the polyester (H) used in an excess amount in the synthesis of the block polymer (J) may react with some of the hydroxyl groups of the polyhydric alcohol compound (K-2) to form ester bonds.

It is not necessarily required that a preferred polymer compound (L) of the present invention be synthesized from the block polymer (J) and the polyhydric alcohol compound (K-2), as long as the polymer compound (L) has a structure that is equivalent to the one in which the block polymer (J) having a structure comprising carboxyl groups at both ends and the polyhydric alcohol compound (K-2) having three or more hydroxyl groups are bound via an ester bond formed by a carboxyl group of the block polymer (J) and a hydroxyl group of the polyhydric alcohol compound (K-2).

In the resin composition according to the antistatic fiber of the present invention, the block constituted by the polyester (H) in the polymer compound (L) has a number-average molecular weight of preferably 800 to 8,000, more preferably 1,000 to 6,000, still more preferably 2,000 to 4,000, in terms of polystyrene. Further, in the polymer compound (L), the block constituted by the compound (I) having hydroxyl groups at both ends has a number-average molecular weight of preferably 400 to 6,000, more preferably 1,000 to 5,000, still more preferably 2,000 to 4,000, in terms of polystyrene. Moreover, in the polymer compound (L), the block constituted by the block polymer (J) having a structure comprising carboxyl groups at both ends has a number-average molecular weight of preferably 5,000 to 25,000, more preferably 7,000 to 17,000, still more preferably 9,000 to 13,000, in terms of polystyrene.

The polymer compound (L) may also be obtained by preparing the polyester (H) from a diol, an aliphatic dicarboxylic acid and an aromatic dicarboxylic acid and then allowing the polyester (H) to react with the compound (I) and/or the compound (K) having a reactive functional group without isolating the polyester (H).

From the standpoints of the antistaticity, the persistence thereof and the water resistance, the polymer compound (L) is incorporated in an amount of 1 to 40 parts by mass, preferably 3 to 20 parts by mass, more preferably 5 to 15 parts by mass, with respect to 100 parts by mass of the polyolefin resin.

In the resin composition according to the antistatic fiber of the present invention, it is also preferred to incorporate at least one selected from the group consisting of alkali metal salts and Group II element salts (M) for the purpose of improving the antistatic performance.

Examples of the alkali metal salts and Group II element salts include salts of organic acids and inorganic acids. Examples of the alkali metal include lithium, sodium, potassium, cesium and rubidium, and examples of the Group II element include beryllium, magnesium, calcium, strontium and barium.

Examples of the organic acids include aliphatic monocarboxylic acids having 1 to 18 carbon atoms, such as formic acid, acetic acid, propionic acid, butyric acid and lactic acid; aliphatic dicarboxylic acids having 1 to 12 carbon atoms, such as oxalic acid, malonic acid, succinic acid, fumaric acid, maleic acid and adipic acid; aromatic carboxylic acids, such as benzoic acid, phthalic acid, isophthalic acid, terephthalic acid and salicylic acid; and sulfonic acids having 1 to 20 carbon atoms, such as methanesulfonic acid, p-toluenesulfonic acid, dodecylbenzenesulfonic acid and trifluoromethanesulfonic acid, and examples of the inorganic acids include hydrochloric acid, hydrobromic acid, sulfuric acid, sulfurous acid, phosphoric acid, phosphorous acid, polyphosphoric acid, nitric acid, and perchloric acid. Particularly, from the standpoint of the antistaticity, alkali metal salts are preferred, salts of lithium, sodium or potassium are more preferred, and salts of lithium or sodium are more preferred. Further, from the standpoint of the antistaticity, acetates, perchlorates, p-toluenesulfonates and dodecylbenzenesulfonates are preferred.

Specific examples of the alkali metal salts and Group II element salts include lithium acetate, sodium acetate, potassium acetate, lithium chloride, sodium chloride, potassium chloride, magnesium chloride, calcium chloride, lithium phosphate, sodium phosphate, potassium phosphate, lithium sulfate, sodium sulfate, magnesium sulfate, calcium sulfate, lithium perchlorate, sodium perchlorate, potassium perchlorate, lithium p-toluenesulfonate, sodium p-toluenesulfonate, potassium p-toluenesulfonate, lithium dodecylbenzenesulfonate, sodium dodecylbenzenesulfonate and potassium dodecylbenzenesulfonate. Thereamong, for example, lithium acetate, potassium acetate, lithium p-toluenesulfonate, sodium p-toluenesulfonate and lithium chloride are preferred.

From the standpoints of the antistaticity, the persistence thereof and the water resistance, the alkali metal salt(s) and/or Group II element salt(s) is/are incorporated in an amount of preferably 0.1 to 15 parts by mass, more preferably 0.5 to 10 parts by mass, still more preferably 1 to 5 parts by mass, with respect to 100 parts by mass of the polyolefin resin.

In the resin composition according to the antistatic fiber of the present invention, a surfactant may also be incorporated in such a range that does not impair the effects of the present invention. As the surfactant, a nonionic, anionic, cationic or amphoteric surfactant can be used.

Examples of the nonionic surfactant, anionic surfactant, cationic surfactant and amphoteric surfactant that can be used include the same ones as those exemplified above for the antistatic resin composition for containers and pipes of organic solvents.

When a surfactant is incorporated, the amount thereof is preferably 0.1 to 10 parts by mass, more preferably 0.5 to 5 parts by mass, with respect to 100 parts by mass of the polyolefin resin.

Further, in the resin composition according to the antistatic fiber of the present invention, a polymer-type antistatic agent may also be incorporated. Examples of the polymer-type antistatic agent that can be used include the same ones as those exemplified above for the antistatic resin composition for containers and pipes of organic solvents.

When a polymer-type antistatic agent is incorporated, the amount thereof is preferably 0.1 to 10 parts by mass, more preferably 0.5 to 5 parts by mass, with respect to 100 parts by mass of the polyolefin resin.

Still further, in the resin composition according to the antistatic fiber of the present invention, an ionic liquid may also be incorporated in such a range that does not impair the effects of the present invention. Examples of the ionic liquid include the same ones as those exemplified above for the antistatic resin composition for containers and pipes of organic solvents.

When an ionic liquid is incorporated, the amount thereof is preferably 0.01 to 5 parts by mass, more preferably 0.1 to 3 parts by mass, with respect to 100 parts by mass of the polyolefin resin.

Yet still further, in the resin composition according to the antistatic fiber of the present invention, a compatibilizer may also be incorporated in such a range that does not impair the effects of the present invention. By incorporating a compatibilizer, the compatibility of the antistatic component with other components and the resin component can be improved. Examples of the compatibilizer include the same ones as those exemplified above for the antistatic resin composition for containers and pipes of organic solvents.

When a compatibilizer is incorporated, the amount thereof is preferably 0.01 to 5 parts by mass, more preferably 0.1 to 3 parts by mass, with respect to 100 parts by mass of the polyolefin resin.

In the resin composition according to the antistatic fiber of the present invention, a thermoplastic resin other than the polyolefin resin may also be incorporated in such a range that does not impair the effects of the present invention.

Examples of such other thermoplastic resin include halogen-containing resins, such as polyvinyl chloride, polyvinylidene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers, and vinyl chloride-cyclohexylmaleimide copolymers; petroleum resins; coumarone resins; polystyrenes; polyvinyl acetates; acrylic resins; copolymers (e.g., AS resins, ABS resins, ACS resins, SBS resins, MBS resins and heat-resistant ABS resins) composed of styrene and/or α-methylstyrene with other monomer (e.g., maleic anhydride, phenylmaleimide, methyl methacrylate, butadiene or acrylonitrile); polymethyl methacrylates; polyvinyl alcohols; polyvinyl formals; polyvinyl butyrals; aromatic polyesters such as polyalkylene terephthalates (e.g., polyethylene terephthalate, polybutylene terephthalate and polycyclohexane dimethylene terephthalate) and polyalkylene naphthalates (e.g., polyethylene naphthalate and polybutylene naphthalate), and linear polyesters such as polytetramethylene terephthalate; degradable aliphatic polyesters, such as polyhydroxy butyrate, polycaprolactone, polybutylene succinate, polyethylene succinate, polylactic acid, polymalic acid, polyglycolic acid, polydioxane and poly(2-oxetanone); and thermoplastic resins and blends thereof, such as polyamides (e.g., polyphenylene oxide, polycaprolactam and polyhexamethylene adipamide), polycarbonates, polycarbonate/ABS resins, branched polycarbonates, polyacetals, polyphenylene sulfides, polyurethanes, cellulose-based resins, polyimide resins, polysulfones, polyphenylene ethers, polyether ketones, polyether ether ketones and liquid crystal polymers. Examples of the thermoplastic resins also include isoprene rubbers, butadiene rubbers, acrylonitrile-butadiene copolymer rubbers, styrene-butadiene copolymer rubbers, fluorocarbon rubbers, silicone rubbers, and thermoplastic elastomers such as polystyrene-based thermoplastic elastomers, polyvinyl chloride-based thermoplastic elastomers, polyester-based thermoplastic elastomers, polyamide-based thermoplastic elastomers and polyurethane-based thermoplastic elastomers. These thermoplastic resins may be used individually, or two or more thereof may be used in combination. Further, these thermoplastic resins may be alloyed as well.

A method of producing the resin composition according to the antistatic fiber of the present invention is not particularly restricted, and any commonly used method can be employed as long as the polymer compound (L), the alkali metal salt(s) and/or Group II element salt(s) as required, and other arbitrary component(s) are incorporated into the polyolefin resin component. For example, such components can be mixed and kneaded into the polyolefin resin by roll kneading or bumper kneading, or using an extruder, a kneader or the like.

The polymer compound (L) may be directly added; however, as required, the polymer compound (L) may be impregnated into a carrier before the addition. In order to impregnate the polymer compound (L) into a carrier, the polymer compound (L) and the carrier can be directly heat-mixed or, as required, a method in which the polymer compound (L) is diluted with an organic solvent before impregnated into the carrier and the solvent is subsequently removed can be employed. As the carrier, one which is known as a filler or bulking agent of a synthetic resin, or a flame retardant or light stabilizer that is solid at normal temperature can be employed, and examples of such a carrier include calcium silicate powder, silica powder, talc powder, alumina powder, titanium oxide powder and these carriers with a chemically modified surface, as well as the below-described flame retardants and antioxidants that are solid. Thereamong, those carriers with a chemically modified surface are preferred, and silica powder having a chemically modified surface is more preferred. These carriers have an average particle size of preferably 0.1 to 100 μm, more preferably 0.5 to 50 μm.

As a method of incorporating the polymer compound (L) into a polyolefin resin, the polymer compound (L) may be synthesized while kneading the block polymer (J) and the compound (K) having a reactive functional group with the polyolefin resin and, in this process, as required, at least one selected from the group consisting of alkali metal salts and Group 11 element salts may also be kneaded at the same time. Alternatively, the polymer compound (L) may be incorporated by mixing along with at least one selected from the group consisting of alkali metal salts and Group II element salts as required and the polyolefin resin at the time of fiber formation, or a masterbatch of these components with the polyolefin resin, which has been produced in advance, may be incorporated.

Further, the polymer compound (L) and at least one selected from the group consisting of alkali metal salts and Group II element salts may be mixed in advance, and the resulting mixture may then be incorporated into the polyolefin resin, or the polymer compound (L) synthesized with an addition of a salt during the reaction may be incorporated into the polyolefin resin.

In the resin composition according to the antistatic fiber of the present invention, as required, a variety of additives such as a phenolic antioxidant, a phosphorus-based antioxidant, a thioether-based antioxidant, an ultraviolet absorber and a hindered amine-based light stabilizer may also be incorporated in such a range that does not impair the effects of the present invention. By this, the resin composition according to the antistatic fiber of the present invention can be stabilized.

Examples of the phenolic antioxidant include the same ones as those exemplified above for the antistatic resin composition for containers and pipes of organic solvents. These phenolic antioxidants are added in an amount of preferably 0.001 to 10 parts by mass, more preferably 0.05 to 5 parts by mass, with respect to 100 parts by mass of the polyolefin resin.

Examples of the phosphorus-based antioxidant include the same ones as those exemplified above for the antistatic resin composition for containers and pipes of organic solvents. These phosphorus-based antioxidants are added in an amount of preferably 0.001 to 10 parts by mass, more preferably 0.05 to 5 parts by mass, with respect to 100 parts by mass of the polyolefin resin.

Examples of the thioether-based antioxidant include the same ones as those exemplified above for the antistatic resin composition for containers and pipes of organic solvents. These thioether-based antioxidants are added in an amount of preferably 0.001 to 10 parts by mass, more preferably 0.05 to 5 parts by mass, with respect to 100 parts by mass of the polyolefin resin.

Examples of the ultraviolet absorber include the same ones as those exemplified above for the antistatic resin composition for containers and pipes of organic solvents. These ultraviolet absorbers are added in an amount of preferably 0.001 to 30 parts by mass, more preferably 0.05 to 10 parts by mass, with respect to 100 parts by mass of the polyolefin resin.

Examples of the hindered amine-based light stabilizer include the same ones as those exemplified above for the antistatic resin composition for containers and pipes of organic solvents. These hindered amine-based light stabilizers are added in an amount of preferably 0.001 to 30 parts by mass, more preferably 0.05 to 10 parts by mass, with respect to 100 parts by mass of the polyolefin resin.

It is preferred to further add a known neutralizer as required for the purpose of neutralizing residual catalyst contained in the synthesized polyolefin resin. Examples of the neutralizer include fatty acid metal salts, such as calcium stearate, lithium stearate and sodium stearate; and fatty acid amide compounds, such as ethylene-bis(stearamide), ethylene-bis(12-hydroxystearamide) and stearic acid amide, and these neutralizers may be used in the form of a mixture.

Further, to the resin composition according to the antistatic fiber of the present invention, as required, for example, a nucleating agent (e.g., an aromatic metal carboxylate, an alicyclic metal alkylcarboxylate, aluminum p-tert-butylbenzoate, an aromatic metal phosphate, or a kind of dibenzylidene sorbitol), a metallic soap, a hydrotalcite, a triazine ring-containing compound, a metal hydroxide, a phosphoric acid ester-based flame retardant, a condensed phosphoric acid ester-based flame retardant, a phosphate-based flame retardant, an inorganic phosphorus-based flame retardant, a (poly)phosphate-based flame retardant, a halogen-based flame retardant, a silicon-based flame retardant, an antimony oxide such as antimony trioxide, other inorganic flame retardant aid, other organic flame retardant aid, a filler, a pigment, a lubricant, and/or a foaming agent, may also be added.

Examples of the above-described triazine ring-containing compound, metal hydroxide, phosphoric acid ester-based flame retardant, condensed phosphoric acid ester-based flame retardant, (poly)phosphate-based flame retardant, other inorganic flame retardant aid and other organic flame retardant aid include the same ones as those exemplified above for the antistatic resin composition for containers and pipes of organic solvents.

In addition, in the resin composition according to the antistatic fiber of the present invention, as required, an additive(s) normally used in synthetic resins, for example, a cross-linking agent, an anti-fogging agent, an anti-plate-out agent, a surface treatment agent, a plasticizer, a lubricant, a flame retardant, a fluorescent agent, an antifungal agent, an antibacterial agent, a foaming agent, a metal inactivator, a mold-release agent, a pigment, a processing aid, an antioxidant and/or a light stabilizer, may also be incorporated in such a range that does not impair the effects of the present invention.

The antistatic fiber of the present invention can be produced by melt-spinning, extrusion-spinning or the like of the resin composition of the present invention in accordance with a conventionally known method. The constitution of the fiber may be of a single-component fiber obtained from the resin composition of the present invention, or of a composite fiber with other polymer(s).

The form of the antistatic fiber of the present invention is not particularly restricted, and examples thereof include single-strand monofilaments having a diameter of 0.1 to 1 mm and an indefinite length, and multifilaments constituted by a number of thin continuous filaments or strands.

Next, the fabric of the present invention will be described.

The fabric of the present invention can be produced by a conventionally known method using the antistatic fiber of the present invention, and the antistatic fiber of the present invention is preferably used for a nonwoven fabric in particular. The production method of the nonwoven fabric is not particularly restricted, and examples thereof include known methods, such as spinning-type nonwoven fabric production methods (e.g., sprayed fiber method, spunbonding method, split-fiber method and mesh method), mechanical bonding-type nonwoven fabric production methods (e.g., needle-punching method and stitching method), and adhesive-type nonwoven fabric production methods [such as the use of a water-soluble adhesive (e.g., starch paste, polyvinyl alcohol, casein, carboxymethyl cellulose or alginate), an emulsified adhesive (e.g., polyvinyl chloride, polyvinylidene chloride, polyvinyl acetate, natural rubber, SBR or NBR), a solvent-type adhesive or the like]. Thereamong, a spinning-type nonwoven fabric production method is preferred, and a spunbonding method is more preferred.

The nonwoven fabric of the present invention may consist of only the antistatic fiber of the present invention, or may be constituted by a mixture of the antistatic fiber of the present invention and other fiber(s). In the latter case, the mix ratio of the antistatic fiber of the present invention and other fiber(s) may be selected as appropriate within a range of 95/5 to 10/90 in accordance with the intended use.

In the nonwoven fabric of the present invention, the air permeability is usually not less than 60 $cc/cm^2/sec$, preferably 80 to 120 $cc/cm^2/sec$, and the bulk density is usually 0.08 to 0.2 $g/cm^3$, preferably 0.1 to 0.15 $g/cm^3$.

The use of the fabric of the present invention is not particularly restricted, and examples thereof include clothes and workwears. The use of the nonwoven fabric, which is a particularly preferred mode of the fabric of the present invention, is not particularly restricted, and the nonwoven fabric can be used in a wide range of applications, such as nonwoven fabrics for clothes (e.g., interlining, adhesive interlining), protection (e.g., protective wears, safety masks), medicine (e.g., scrub suits, sheets, artificial skins), construction (e.g., carpet base cloths, sound-proof flooring, vibration-proof materials, curing sheets), vehicles (e.g., automobile interior materials, sound-absorbing materials), sanitary goods (e.g., diapers, sanitary napkins), filters (e.g., air filters, bag filters, wastewater treatment mats), agriculture, leathers (e.g., base cloths for artificial leathers, base cloths for synthetic leathers, base cloths for PVC leathers), electric and electronic components (e.g., transport materials, packaging materials), electric and electronic appliances (e.g., transport materials, packaging materials) and other industrial materials (e.g., oil absorbents, electromagnetic wave-shielding materials, synthetic papers, office automation equipments, audio-visual instruments, packaging materials), and filter clothes.

EXAMPLES

Example 1

The present invention will now be described concretely by way of examples thereof. It is noted here that, in the below-described Examples and the like, "%" and "ppm" are all based on mass unless otherwise specified.

The polymer compounds (E) used in the present invention were produced in accordance with the below-described Production Examples. In the below-described Production Examples, the number-average molecular weight was determined by the following method of measuring the molecular weight.

<Method for Measuring Molecular Weight>

The number-average molecular weight (hereinafter, referred to as "Mn") was measured by gel permeation chromatography (GPC). The conditions of the Mn measurement were as follows.

Apparatus: GPC apparatus, manufactured by JASCO Corporation

Solvent: tetrahydrofuran

Standard substance: polystyrene

Detector: differential refractometer (RI detector)

Column stationary phase: SHODEX® KF-804L, manufactured by Showa Denko K.K.

Column temperature: 40° C.

Sample concentration: 1 mg/1 mL

Flow rate: 0.8 mL/min

Injection volume: 100 μL

Production Example 1-1

To a separable flask, 656 g of 1,4-cyclohexane dimethanol, 708 g (4.85 mol) of adipic acid, 0.7 g (0.01 mol) of phthalic anhydride and 0.7 g of an antioxidant (tetrakis[3-(3,5-di-tert-butyl-4-hydroxyphenyl)propionyloxymethyl] methane: ADK STAB AO-60, manufactured by ADEKA Corporation) were added, and these materials were allowed to polymerize for 5 hours under normal pressure with the temperature being slowly increased from 160° C. to 210° C., and then for 3 hours at 210° C. under educed pressure, whereby a polyester (A)-1 was obtained. This polyester (A)-1 had an acid value of 28 and a number-average molecular weight (Mn) of 5,400 in terms of polystyrene.

Next, 600 g of the thus obtained polyester (A)-1, 300 g of polyethylene glycol having a number-average molecular weight of 4,000 as a compound (B)-1 having hydroxyl groups at both ends, 0.5 g of an antioxidant (ADK STAB AO-60) and 0.8 g of zirconium octylate were added and allowed to polymerize at 210° C. for 7 hours under reduced pressure, whereby a block polymer (C)-1 having a structure comprising carboxyl groups at both ends was obtained. This block polymer (C)-1 having a structure comprising carboxyl groups at both ends had an acid value of 9 and a number-average molecular weight (Mn) of 12,000 in terms of polystyrene.

To 360 g of the thus obtained block polymer (C)-1 having a structure comprising carboxyl groups at both ends, 6 g of bisphenol F diglycidyl ether was added as an epoxy compound (D)-1, and the resulting mixture was allowed to polymerize at 240° C. for 3 hours under reduced pressure, whereby a polymer compound (E)-1 used in the present invention was obtained.

Production Example 1-2

To a separable flask, 370 g of 1,4-bis(β-hydroxyethoxy)benzene, 289 g (1.98 mol) of adipic acid, 8 g (0.05 mol) of isophthalic acid and 0.5 g of an antioxidant (ADK STAB AO-60) were added, and these materials were allowed to polymerize for 5 hours under normal pressure with the temperature being slowly increased from 180° C. to 220° C. Then, 0.5 g of tetraisopropoxytitanate was further added, and the resulting mixture was allowed to polymerize at 220° C. under reduced pressure for 5 hours, whereby a polyester (A)-2 was obtained. This polyester (A)-2 had an acid value of 56 and a number-average molecular weight (Mn) of 4,900 in terms of polystyrene.

Next, 300 g of the thus obtained polyester (A)-2, 150 g of polyethylene glycol having a number-average molecular weight of 4,000 as a compound (B)-1 having hydroxyl groups at both ends, 0.5 g of an antioxidant (ADK STAB AO-60) and 0.5 g of zirconium acetate were added and allowed to polymerize at 220° C. for 7 hours under reduced pressure, whereby a block polymer (C)-2 having a structure comprising carboxyl groups at both ends was obtained. This block polymer (C)-2 having a structure comprising carboxyl groups at both ends had an acid value of 11 and a number-average molecular weight (Mn) of 12,300 in terms of polystyrene.

To 300 g of the thus obtained block polymer (C)-2, 11 g of dicyclopentadiene methanol diglycidyl ether was added as an epoxy compound (D)-2, and the resulting mixture was allowed to polymerize at 240° C. for 4 hours under reduced pressure, whereby a polymer compound (E)-2 used in the present invention was obtained.

Production Example 1-3

To a separable flask, 591 g of ethylene oxide adduct of bisphenol A, 235 g (1.16 mol) of sebacic acid, 8 g (0.05 mol) of isophthalic acid, 300 g of polyethylene glycol having a number-average molecular weight of 2,000 as a compound (B)-2 having hydroxyl groups at both ends and 0.8 g of an antioxidant (ADK STAB AO-60) were added, and these materials were allowed to polymerize for 5 hours under normal pressure with the temperature being slowly increased from 180° C. to 220° C. Then, 0.6 g of tetraisopropoxytitanate was further added, and the resulting mixture was allowed to polymerize at 220° C. for 7 hours under reduced pressure, whereby a block polymer (C)-3 having a structure comprising carboxyl groups at both ends was obtained. This block polymer (C)-3 having a structure comprising carboxyl groups at both ends had an acid value of 10 and a number-average molecular weight (Mn) of 10,100 in terms of polystyrene.

To 300 g of the thus obtained block polymer (C)-3 having a structure comprising carboxyl groups at both ends, 7 g of epoxidized soybean oil as an epoxy compound (D)-3 and 0.5 g of zirconium acetate were added, and the resulting mixture was allowed to polymerize at 240° C. for 5 hours under reduced pressure, whereby a polymer compound (E)-3 used in the present invention was obtained.

Examples 1-1 to 1-14 and Comparative Examples 1-1 to 1-6

Using resin compositions that were blended based on the respective formulations (parts by mass) shown in Tables 1 and 2 below, test pieces were obtained in accordance with the below-described test piece preparation conditions. The thus obtained test pieces were each subjected to the measurement of surface specific resistance (SR value) and the test for evaluation of organic solvent resistance as described below. In the same manner, the resin compositions of Comparative Examples were prepared in accordance with the respective formulations shown in Table 3 below and evaluated.

<Test Piece Preparation Conditions>

Using a biaxial extruder manufactured by Ikegai Corp. (PCM30, equipped with a 60-mesh screen), resin compositions that were blended based on the respective formulations shown in Tables 1 to 3 below were each granulated under the conditions of 230° C. and 6 kg/hour to obtain pellets. Then, using a horizontal injection molding machine (NEX80, manufactured by Nissei Plastic Industrial Co., Ltd.), the thus obtained pellets were each molded at a resin temperature of 230° C. and a die temperature of 40° C. to prepare test pieces (100 mm×100 mm×3 mm) for the measurement of surface specific resistance and the evaluation of organic solvent resistance.

<Method for Measuring Surface Specific Resistance (SR Value)>

The thus obtained test pieces for the measurement of surface specific resistance (100 mm×100 mm×3 mm) were each molded and, immediately thereafter, stored under the conditions of a temperature of 25° C. and a humidity of 60% RH. After 1 day and 30 days of storage, under the same atmosphere, the surface specific resistance (Ω/□) of each molded test piece was measured using an R8340 resistance meter manufactured by Advantest Corporation under the conditions of an applied voltage of 100 V and a voltage application time of 1 minute. The measurement was performed at five spots, and an average thereof was determined.

<Test for Evaluation of Organic Solvent Resistance>

The thus obtained test pieces for the evaluation of organic solvent resistance (100 mm×100 mm×3 mm) were immersed in an 80% aqueous ethanol solution, octane or toluene. After 14 days, the test pieces were removed from each organic solvent and dried in a 60° C. blast drying oven. Then, after leaving the thus dried test pieces to stand for 24 hours in an incubator adjusted to have a temperature of 25° C. and a humidity of 60%, the surface specific resistance ($\Omega/\square$) of each test piece was measured in the same atmosphere using an R8340 resistance meter manufactured by Advantest Corporation under the conditions of an applied voltage of 100 V and a voltage application time of 1 minute. The measurement was performed at five spots, and an average thereof was determined.

TABLE 1

|  |  | Example |  |  |  |  |  |  |
|---|---|---|---|---|---|---|---|---|
|  |  | 1-1 | 1-2 | 1-3 | 1-4 | 1-5 | 1-6 | 1-7 |
| High-density polyethylene*[1-1] | | 100 | 100 | 100 | 100 | 100 | 100 | 100 |
| Polymer compound (E) | (E)-1 | 10 | 20 | | | | | 20 |
| | (E)-2 | | | 10 | 20 | | | |
| | (E)-3 | | | | | 10 | 20 | |
| Alkali metal salt | NaDBS*[1-2] | 0.5 | 1.0 | 0.5 | 1.0 | | | |
| | LiOTs*[1-3] | | | | | 0.5 | 1.0 | |
| Surface specific resistance ($\Omega/\square$) | After 1 day | $1 \times 10^{11}$ | $7 \times 10^{9}$ | $3 \times 10^{11}$ | $5 \times 10^{9}$ | $6 \times 10^{10}$ | $3 \times 10^{9}$ | $7 \times 10^{10}$ |
| | After 30 days | $1 \times 10^{11}$ | $7 \times 10^{9}$ | $2 \times 10^{11}$ | $5 \times 10^{9}$ | $6 \times 10^{10}$ | $3 \times 10^{9}$ | $7 \times 10^{10}$ |
| Organic solvent resistance evaluation test ($\Omega/\square$) | in 80% aqueous ethanol solution | $2 \times 10^{11}$ | $7 \times 10^{9}$ | $2 \times 10^{11}$ | $5 \times 10^{9}$ | $7 \times 10^{10}$ | $3 \times 10^{9}$ | $7 \times 10^{10}$ |
| | in octane | $1 \times 10^{11}$ | $7 \times 10^{9}$ | $2 \times 10^{11}$ | $5 \times 10^{9}$ | $6 \times 10^{10}$ | $3 \times 10^{9}$ | $7 \times 10^{10}$ |
| | in toluene | $1 \times 10^{11}$ | $5 \times 10^{9}$ | $1 \times 10^{11}$ | $5 \times 10^{9}$ | $5 \times 10^{10}$ | $2 \times 10^{9}$ | $6 \times 10^{10}$ |

*[1-1]high-density polyethylene manufactured by Japan Polyethylene Corporation: trade name "NOVATEC ™ HD HJ560" (melt flow rate = 7 g/10 min)
*[1-2]sodium dodecylbenzenesulfonate
*[1-3]lithium p-toluenesulfonate

TABLE 2

|  |  | Example |  |  |  |  |  |  |
|---|---|---|---|---|---|---|---|---|
|  |  | 1-8 | 1-9 | 1-10 | 1-11 | 1-12 | 1-13 | 1-14 |
| Polypropylene[1-4] | | 100 | 100 | 100 | 100 | 100 | 100 | 100 |
| Polymer compound (E) | (E)-1 | 10 | 20 | | | | | 20 |
| | (E)-2 | | | 10 | 20 | | | |
| | (E)-3 | | | | | 10 | 20 | |
| Alkali metal salt | NaDBS*[1-2] | 0.5 | 1.0 | 0.5 | 1.0 | | | |
| | LiOTs*[1-3] | | | | | 0.5 | 1.0 | |
| Surface specific resistance ($\Omega/\square$) | After 1 day | $8 \times 10^{10}$ | $4 \times 10^{9}$ | $1 \times 10^{11}$ | $6 \times 10^{9}$ | $7 \times 10^{10}$ | $3 \times 10^{9}$ | $9 \times 10^{10}$ |
| | After 30 days | $8 \times 10^{10}$ | $4 \times 10^{9}$ | $1 \times 10^{11}$ | $6 \times 10^{9}$ | $7 \times 10^{10}$ | $3 \times 10^{9}$ | $8 \times 10^{10}$ |
| Organic solvent resistance evaluation test ($\Omega/\square$) | in 80% aqueous ethanol solution | $8 \times 10^{10}$ | $5 \times 10^{9}$ | $1 \times 10^{11}$ | $6 \times 10^{9}$ | $7 \times 10^{10}$ | $3 \times 10^{9}$ | $8 \times 10^{10}$ |
| | in octane | $8 \times 10^{10}$ | $4 \times 10^{9}$ | $1 \times 10^{11}$ | $6 \times 10^{9}$ | $7 \times 10^{10}$ | $3 \times 10^{9}$ | $8 \times 10^{10}$ |
| | in toluene | $7 \times 10^{10}$ | $4 \times 10^{9}$ | $1 \times 10^{11}$ | $5 \times 10^{9}$ | $7 \times 10^{10}$ | $3 \times 10^{9}$ | $8 \times 10^{10}$ |

*[1-4]homopolypropylene (melt flow rate (ISO1133, 230° C. × 2.16 kg) = 8 g/10 min)

TABLE 3

|  |  | Comparative Example |  |  |  |  |  |
|---|---|---|---|---|---|---|---|
|  |  | 1-1 | 1-2 | 1-3 | 1-4 | 1-5 | 1-6 |
| High-density polyethylene*[1-1] | | 100 | 100 | 100 | | | |
| Polypropylene*[1-4] | | | | | 100 | 100 | 100 |
| Comparative antistatic agent*[1-5] | | | 1.0 | 10 | | 1.0 | 10 |
| Surface specific resistance ($\Omega/\square$) | After 1 day | $3 \times 10^{16}$ | $6 \times 10^{12}$ | $2 \times 10^{11}$ | $2 \times 10^{16}$ | $1 \times 10^{12}$ | $1 \times 10^{11}$ |
| | After 30 days | $3 \times 10^{16}$ | $3 \times 10^{11}$ | $7 \times 10^{10}$ | $2 \times 10^{16}$ | $1 \times 10^{11}$ | $8 \times 10^{10}$ |

TABLE 3-continued

| | | Comparative Example | | | | | |
|---|---|---|---|---|---|---|---|
| | | 1-1 | 1-2 | 1-3 | 1-4 | 1-5 | 1-6 |
| Organic solvent resistance evaluation test ($\Omega/\square$) | in 80% aqueous ethanol solution | $3 \times 10^{16}$ | $3 \times 10^{16}$ | $3 \times 10^{16}$ | $2 \times 10^{16}$ | $2 \times 10^{16}$ | $2 \times 10^{16}$ |
| | in octane | $3 \times 10^{16}$ | $3 \times 10^{16}$ | $3 \times 10^{16}$ | $2 \times 10^{16}$ | $2 \times 10^{16}$ | $2 \times 10^{16}$ |
| | in toluene | $3 \times 10^{16}$ | $3 \times 10^{16}$ | $3 \times 10^{16}$ | $3 \times 10^{16}$ | $2 \times 10^{16}$ | $2 \times 10^{16}$ |

*[1-5] glycerin monostearate

As shown in Table 3 above, in Comparative Examples 1-3 and 1-6 where 10 parts by mass glycerin monostearate was incorporated, glycerin monostearate bled out to the surface of each test piece, making the test piece surface sticky.

From the above, it is seen that the resin compositions according to the present invention had long-lasting and sufficient antistaticity and their performance was not impaired even when the resin compositions were immersed in various organic solvents for a long period of time. Therefore, the resin composition of the present invention is suitable for containers (e.g., bottles, tanks), pipes and the like that come into contact with an organic solvent.

Example 2

The antistatic fiber of the present invention will now be described in more detail by way of examples thereof; however, the present invention is not restricted thereto. It is noted here that, in the below-described Examples and Comparative Examples, "%" is based on mass unless otherwise specified.

The polymer compounds (E) used in the present invention was produced in accordance with the below-described Production Examples 2-1 to 2-4. In Production Examples 2-1 to 2-4 below, the number-average molecular weight was determined in the same manner as in the above-described Production Example 1-1 and the like.

Production Example 2-1

To a separable flask, 765 g of 1,4-cyclohexane dimethanol, 826 g (5.65 mol) of adipic acid, 0.8 g (0.01 mol) of phthalic anhydride and 0.2 g of an antioxidant (tetrakis[3-(3,5-di-tert-butyl-4-hydroxyphenyl)propionyloxymethyl]methane: ADK STAB AO-60, manufactured by ADEKA Corporation) were added, and these materials were allowed to polymerize for 6 hours under normal pressure with the temperature being slowly increased from 160° C. to 210° C., and then for 3 hours at 210° C. under reduced pressure, whereby a polyester (H)-1 was obtained. This polyester (H)-1 had an acid value of 28 and a number-average molecular weight (Mn) of 5,400 in terms of polystyrene.

Next, 700 g of the thus obtained polyester (H)-1, 350 g of polyethylene glycol having a number-average molecular weight of 4,000 as a compound (I)-1 having hydroxyl groups at both ends, 0.5 g of an antioxidant (ADK STAB AO-60) and 0.9 g of zirconium octylate were added and allowed to polymerize at 210° C. for 8 hours under reduced pressure, whereby a block polymer (J)-1 having a structure comprising carboxyl groups at both ends was obtained. This block polymer (J)-1 having a structure comprising carboxyl groups at both ends had an acid value of 9 and a number-average molecular weight (Mn) of 12,000 in terms of polystyrene.

To 360 g of the thus obtained block polymer (J)-1 having a structure comprising carboxyl groups at both ends, 6 g of bisphenol F diglycidyl ether was added as an epoxy compound (K-1)-1, and the resulting mixture was allowed to polymerize at 240° C. for 3 hours under reduced pressure, whereby a polymer compound (L)-1 used in the present invention was obtained.

Production Example 2-2

To a separable flask, 601 g of 1,4-bis(β-hydroxyethoxy)benzene, 472 g (3.23 mol) of adipic acid, 3.8 g (0.02 mol) of 2,6-naphthalenedicarboxylic acid, 600 g of polyethylene glycol having a number-average molecular weight of 4,000 as a compound (I)-1 having hydroxyl groups at both ends, and 0.2 g of an antioxidant (ADK STAB AO-60) were added, and these materials were allowed to polymerize for 6 hours under normal pressure with the temperature being slowly increased from 180° C. to 220° C. Then, 0.8 g of tetraisopropoxytitanate was further added, and the resulting mixture was allowed to polymerize at 220° C. for 6 hours under reduced pressure, whereby a block polymer (J)-2 having a structure comprising carboxyl groups at both ends was obtained. This block polymer (J)-2 having a structure comprising carboxyl groups at both ends had an acid value of 9 and a number-average molecular weight (Mn) of 11,500 in terms of polystyrene.

To 300 g of the thus obtained block polymer (J)-2 having a structure comprising carboxyl groups at both ends, 3 g of o-cresol novolac-type epoxy resin as an epoxy compound (K-1)-2 and 0.5 g of zirconium acetate were added, and these materials were allowed to polymerize for 2 hours at 240° C. under reduced pressure, whereby a polymer compound (L)-2 used in the present invention was obtained.

Production Example 2-3

To a separable flask, 300 g of the block polymer (J)-1 having a structure comprising carboxyl groups at both ends, which was obtained by the method described in Production Example 1, and 5.1 g of pentaerythritol as a polyhydric alcohol compound (K-2)-1 were added, and these materials were allowed to polymerize at 220° C. for 4 hours under reduced pressure, whereby a polymer compound (L)-3 used in the present invention was obtained.

Production Example 2-4

To a separable flask, 591 g of ethylene oxide adduct of bisphenol A, 235 g (1.16 mol) of sebacic acid, 8 g (0.05 mol) of isophthalic acid and 0.5 g of an antioxidant (ADK STAB AO-60) were added, and these materials were allowed to polymerize for 4 hours under normal pressure with the temperature being slowly increased from 160° C. to 220° C.

Then, 0.5 g of tetraisopropoxytitanate was further added, and the resulting mixture was allowed to polymerize at 220° C. for 5 hours under reduced pressure, whereby a polyester (H)-2 was obtained. This polyester (H)-2 had an acid value of 56 and a number-average molecular weight (Mn) of 2,300 in terms of polystyrene.

Next, 300 g of the thus obtained polyester (H)-2, 200 g of polyethylene glycol having a number-average molecular weight of 2,000 as a compound (I)-2 having hydroxyl groups at both ends, 0.5 g of an antioxidant (ADK STAB AO-60) and 0.5 g of zirconium acetate were added and allowed to polymerize at 220° C. for 8 hours under reduced pressure, whereby a block polymer (J)-3 having a structure comprising carboxyl groups at both ends was obtained. This block polymer (J)-3 having a structure comprising carboxyl groups at both ends had an acid value of 11 and a number-average molecular weight (Mn) of 10,500 in terms of polystyrene.

To 300 g of the thus obtained block polymer (J)-3 having a structure comprising carboxyl groups at both ends, 10.2 g of sorbitol was added as a polyhydric alcohol compound (K-2)-2, and the resulting mixture was allowed to polymerize at 240° C. for 7 hours under reduced pressure, whereby a polymer compound (L)-4 used in the present invention was obtained.

Examples 2-1 to 2-16 and Comparative Examples 2-1 to 2-8

Using resin compositions that were blended based on the respective formulations (parts by mass) shown in Tables 4 and 5 below, nonwoven fabrics of Examples 2-1 to 2-16 were obtained in accordance with the below-described nonwoven fabric production conditions. The thus obtained nonwoven fabrics were each subjected to the measurement of half-life as an evaluation of the antistaticity and the test for evaluation of the resistance to washing with water as described below. In the same manner, resin compositions of Comparative Examples 2-1 to 2-8 were prepared based on the respective formulations shown in Table 6 below, and nonwoven fabrics of Comparative Examples 2-1 to 2-8 were produced and each evaluated.

<Nonwoven Fabric Production Conditions>

The resin compositions, which were blended based on the respective formulations shown in Tables 4 to 6 below, were each kneaded using a uniaxial extruder (apparatus: LABO-PLASTOMILL μ, manufactured by Toyo Seiki Seisaku-sho, Ltd.; extrusion temperature: 250° C., screw speed: 50 rpm) and then spun by a melt-blowing method using a spinning machine (nozzle: 0.45 mmφ, 30-hole nozzle, discharge rate: 1.0 g/min; air supply pressure: 0.7 kg/cm$^2$) to produce nonwoven fabrics having a basis weight of 30 g/m$^2$.

<Method of Measuring Half-Life>

For the thus obtained nonwoven fabrics, the half-life was measured in accordance with JIS-L-1094 using a charge attenuation meter (STATIC HONESTMETER H-0110, manufactured by Shishido Electrostatic, Ltd.). Each nonwoven fabric was charged by irradiation with air ions generated by corona discharge and, after the irradiation was terminated, the time required for the charged voltage to be attenuated to ½ (half-life) was measured. One day and 30 days after the production of each nonwoven fabric, the measurement was performed 5 times at a temperature of 25° C. and a humidity of 50%, and an average thereof was determined. A shorter half-life means superior antistaticity.

<Test for Evaluation of Resistance to Washing with Water>

The thus obtained nonwoven fabrics were each placed in running water for 1 minute, and water on the surface was subsequently removed using an air-cooling dryer. The half-life was measured after leaving each nonwoven fabric to stand for 1 day at a temperature of 25° C. and a humidity of 50%. The measurement was performed 5 times for each nonwoven fabric and an average thereof was determined. A shorter half-life means superior antistaticity.

TABLE 4

| | | Example | | | | | | | |
|---|---|---|---|---|---|---|---|---|---|
| | | 2-1 | 2-2 | 2-3 | 2-4 | 2-5 | 2-6 | 2-7 | 2-8 |
| Polyolefin resin | PP*[2-1] | 100 | 100 | 100 | 100 | 100 | | | 100 |
| | HDPE*[2-2] | | | | | | 100 | 100 | |
| Polymer compound (E) | (E)-1 | 10 | 10 | 7 | 15 | 10 | 10 | 10 | |
| | (E)-2 | | | | | | | | 10 |
| | (E)-3 | | | | | | | | |
| | (E)-4 | | | | | | | | |
| Alkali metal salt | NaDBS*[2-3] | | 0.5 | 0.3 | 0.8 | | | | |
| | LiOTs*[2-4] | | | | | | 0.5 | | |
| | KOAc*[2-5] | | | | | | | 0.5 | |
| Half-life (seconds) | After 1 day | 2.0 | <0.5 | 1.0 | <0.5 | <0.5 | 1.5 | <0.5 | 2.0 |
| | After 30 days | 2.0 | <0.5 | 1.0 | <0.5 | <0.5 | 1.5 | <0.5 | 2.0 |
| | After washing with water | 2.0 | <0.5 | 1.0 | <0.5 | <0.5 | 1.5 | <0.5 | 2.0 |

*[2-1] homopolypropylene, manufactured by Japan Polypropylene Corporation: trade name: "MA1B" (melt flow rate = 21 g/10 min)

*[2-2] high-density polyethylene, manufactured by The Dow Chemical Company, trade name: "DMDA-8940" (melt flow rate = 44 g/10 min)

*[2-3] sodium dodecylbenzenesulfonate

*[2-4] lithium p-toluenesulfonate

*[2-5] potassium acetate

TABLE 5

| | | \multicolumn{8}{c}{Example} |
|---|---|---|---|---|---|---|---|---|---|
| | | 2-9 | 2-10 | 2-11 | 2-12 | 2-13 | 2-14 | 2-15 | 2-16 |
| Polyolefin resin | PP*[2-1] | 100 | | 100 | 100 | | 100 | 100 | |
| | HDPE*[2-2] | | 100 | | | 100 | | | 100 |
| Polymer compound (E) | (E)-1 | | | | | | | | |
| | (E)-2 | 10 | 10 | | | | | | |
| | (E)-3 | | | 10 | 10 | 10 | | | |
| | (E)-4 | | | | | | 10 | 10 | 10 |
| Alkali metal salt | NaDBS*[2-3] | 0.5 | 0.5 | | | | | | |
| | LiOTs*[2-4] | | | | 0.5 | 0.5 | | | |
| | KOAc*[2-5] | | | | | | | 0.5 | 0.5 |
| Half-life (seconds) | After 1 day | <0.5 | <0.5 | 2.0 | <0.5 | <0.5 | 2.5 | <0.5 | <0.5 |
| | After 30 days | <0.5 | <0.5 | 1.5 | <0.5 | <0.5 | 2.5 | <0.5 | <0.5 |
| | After washing with water | <0.5 | <0.5 | 1.5 | <0.5 | <0.5 | 2.5 | <0.5 | <0.5 |

TABLE 6

| | | \multicolumn{8}{c}{Comparative Example} |
|---|---|---|---|---|---|---|---|---|---|
| | | 2-1 | 2-2 | 2-3 | 2-4 | 2-5 | 2-6 | 2-7 | 2-8 |
| Polyolefin resin | PP*[2-1] | 100 | | 100 | 100 | | | 100 | |
| | HDPE*[2-2] | | 100 | | | 100 | 100 | | 100 |
| Comparative Antistatic Agent-1*[2-6] | | | | 1 | 10 | 1 | 10 | | |
| Comparative Antistatic Agent-2*[2-7] | | | | | | | | 10 | 10 |
| Half-life (seconds) | After 1 day | >120 | >120 | 2.0 | 1.0 | 2.0 | 1.0 | 21 | 22 |
| | After 30 days | >120 | >120 | 60 | 15 | 80 | 24 | 20 | 22 |
| | After washing with water | >120 | >120 | >120 | >120 | >120 | >120 | 20 | 22 |

*[2-6] glycerin monostearate
*[2-7] polyether ester amide-based antistatic agent, manufactured by BASF Ltd.: trade name: "IRGASTAT P ®-22"

From Tables 4 to 6, it is seen that the antistatic fibers of the present invention retained excellent antistatic performance over a long period and had excellent water resistance. Meanwhile, the nonwoven fabrics of Comparative Examples 2-4 and 2-6 in which 10 parts by mass of glycerin monostearate had a defect in that glycerin monostearate bled out to the surface and made the surface of each nonwoven fabric sticky.

The invention claimed is:

1. An antistatic resin composition for containers and pipes of organic solvents, said antistatic resin composition comprising 3 to 25 parts by mass of at least one polymer compound (E) with respect to 100 parts by mass of a thermoplastic resin,
wherein said polymer compound (E) has a structure in which a diol, an aliphatic dicarboxylic acid, an aromatic dicarboxylic acid, a compound (B) which comprises at least one group represented by the following Formula (1) and has hydroxyl groups at both ends, and an epoxy compound (D) having two or more epoxy groups are bound via ester bonds:

$$-CH_2-CH_2-O- \quad (1).$$

2. The antistatic resin composition for containers and pipes of organic solvents according to claim 1, wherein said compound (B) constituting said polymer compound (E) is a polyethylene glycol.

3. The antistatic resin composition for containers and pipes of organic solvents according to claim 1, further comprising 0.1 to 5 parts by mass of at least one selected from the group consisting of alkali metal salts (F) and Group II element salts with respect to 100 parts by mass of said thermoplastic resin.

4. The antistatic resin composition for containers and pipes of organic solvents according to claim 1, wherein said thermoplastic resin is a polyolefin resin.

5. The antistatic resin composition for containers and pipes of organic solvents according to claim 1, wherein said polymer compound (E) has a structure in which a polyester (A), which is constituted by a diol, an aliphatic dicarboxylic acid and an aromatic dicarboxylic acid, said compound (B) and said epoxy compound (D) are bound via ester bonds.

6. The antistatic resin composition for containers and pipes of organic solvents according to claim 5, wherein said polymer compound (E) has a structure in which a block polymer (C) having carboxyl groups at both ends and said epoxy compound (D) are bound via an ester bond, said block polymer (C) comprising a block constituted by said polyester (A) and a block constituted by said compound (B) that are repeatedly and alternately bound via ester bonds.

7. The antistatic resin composition for containers and pipes of organic solvents according to claim 6, wherein, in said polymer compound (E),
said block constituted by said polyester (A) has a number-average molecular weight of 800 to 8,000 in terms of polystyrene,
said block constituted by said compound (B) has a number-average molecular weight of 400 to 6,000 in terms of polystyrene, and
said block polymer (C) has a number-average molecular weight of 5,000 to 25,000 in terms of polystyrene.

8. The antistatic resin composition for containers and pipes of organic solvents according to claim 5, wherein said polyester (A) constituting said polymer compound (E) has a structure comprising carboxyl groups at both ends.

9. A container for organic solvents, which is obtained by molding the antistatic resin composition for containers and pipes of organic solvents according to claim 1.

10. A pipe for organic solvents, which is obtained by molding the antistatic resin composition for containers and pipes of organic solvents according to claim 1.

11. An antistatic polyolefin fiber which comprises a resin composition containing 1 to 40 parts by mass of at least one polymer compound (L) with respect to 100 parts by mass of a polyolefin resin,
wherein said polymer compound (L) has a structure in which a diol, an aliphatic dicarboxylic acid, an aromatic dicarboxylic acid, a compound (I) which comprises at least one group represented by the following Formula (1) and has hydroxyl groups at both ends, and a compound (K) having a reactive functional group are bound via ester bonds:

$$-CH_2-CH_2-O- \qquad (1).$$

12. The antistatic polyolefin fiber according to claim 11, wherein said compound (I) constituting said polymer compound (L) is a polyethylene glycol.

13. The antistatic polyolefin fiber according to claim 11, further comprising 0.1 to 15 parts by mass of at least one selected from the group consisting of alkali metal salts and Group II element salts (M) with respect to 100 parts by mass of said polyolefin resin.

14. The antistatic polyolefin fiber according to claim 11, wherein said compound (K) having a reactive functional group is an epoxy compound (K-1) having two or more epoxy groups as reactive functional groups.

15. The antistatic polyolefin fiber according to claim 11, wherein said compound (K) having a reactive functional group is a polyhydric alcohol compound (K-2) having three or more hydroxyl groups as reactive functional groups.

16. The antistatic polyolefin fiber according to claim 11, wherein said polymer compound (L) has a structure in which a polyester (H), which is constituted by a diol, an aliphatic dicarboxylic acid and an aromatic dicarboxylic acid, said compound (I) and said compound (K) having a reactive functional group are bound via ester bonds.

17. The antistatic polyolefin fiber according to claim 16, wherein said polymer compound (L) has a structure in which a block polymer (J) having carboxyl groups at both ends and said compound (K) having a reactive functional group are bound via an ester bond, said block polymer (J) comprising a block constituted by said polyester (H) and a block constituted by said compound (I) that are repeatedly and alternately bound via ester bonds.

18. The antistatic polyolefin fiber according to claim 17, wherein, in said polymer compound (L),
said block constituted by said polyester (H) has a number-average molecular weight of 800 to 8,000 in terms of polystyrene,
said block constituted by said compound (I) has a number-average molecular weight of 400 to 6,000 in terms of polystyrene, and
said block polymer (J) has a number-average molecular weight of 5,000 to 25,000 in terms of polystyrene.

19. The antistatic polyolefin fiber according to claim 16, wherein said polyester (H) constituting said polymer compound (L) has a structure comprising carboxyl groups at both ends.

20. A fabric comprising the antistatic polyolefin fiber according to claim 11.

21. The fabric according to claim 20, which is a nonwoven fabric.

* * * * *